United States Patent
Hsu et al.

(10) Patent No.: US 9,632,283 B2
(45) Date of Patent: Apr. 25, 2017

(54) ELECTRONIC DEVICE AND OPTICAL IMAGING LENS THEREOF

(71) Applicant: GeniuS Electronic Optical Co., Ltd., Taichung (TW)

(72) Inventors: Sheng Wei Hsu, Taichung (TW); Tzu Chien Tang, Taichung (TW)

(73) Assignee: GeniuS Electronic Optical Co., Ltd., Taichung (TW)

( * ) Notice: Subject to any disclaimer, the term of this patent is extended or adjusted under 35 U.S.C. 154(b) by 244 days.

(21) Appl. No.: 14/279,906

(22) Filed: May 16, 2014

(65) Prior Publication Data

US 2015/0212290 A1 Jul. 30, 2015

(30) Foreign Application Priority Data

Jan. 27, 2014 (TW) .............................. 103102970 A

(51) Int. Cl.
  *G02B 9/60* (2006.01)
  *G02B 13/00* (2006.01)
  *G02B 13/04* (2006.01)

(52) U.S. Cl.
  CPC ............ *G02B 9/60* (2013.01); *G02B 13/0045* (2013.01); *G02B 13/04* (2013.01)

(58) Field of Classification Search
  CPC ... G02B 9/00; G02B 9/34; G02B 9/60; G02B 13/00; G02B 13/001; G02B 13/0015; G02B 13/0045; G02B 9/06
  See application file for complete search history.

(56) References Cited

U.S. PATENT DOCUMENTS

| | | | |
|---|---|---|---|
| 6,985,309 B2 | 1/2006 | Shinohara | |
| 7,486,449 B2 * | 2/2009 | Miyano | G02B 23/243 359/770 |
| 7,525,738 B2 | 4/2009 | Lee | |
| 7,609,313 B2 * | 10/2009 | Yamaguchi | H04N 5/2254 348/335 |
| 7,684,127 B2 | 3/2010 | Asami | |
| 8,335,043 B2 | 12/2012 | Huang | |

(Continued)

FOREIGN PATENT DOCUMENTS

| | | |
|---|---|---|
| JP | 4261510 | 9/1992 |
| JP | 2004354572 | 12/2004 |

(Continued)

*Primary Examiner* — Thong Nguyen
(74) *Attorney, Agent, or Firm* — Baker & McKenzie LLP

(57) ABSTRACT

Present invention provides an electronic device and an optical imaging lens thereof. The optical imaging lens comprises a first lens element, a second lens element, a third lens element, a fourth lens element and a fifth lens element positioned in an order from an object side to an image side along an optical axis. The first lens element has negative refractive power, the second lens element has a convex portion formed on the object side surface and a concave portion formed on the image side surface, the third lens element has a convex portion formed on the object side surface and the fifth lens element has a convex portion formed on the image side surface. Through controlling the convex or concave shape of the surfaces, designing parameters satisfying an inequality and/or the refracting power of the lens elements, the field of view is broadened, and the better image performance is maintained.

14 Claims, 27 Drawing Sheets

(56) References Cited

U.S. PATENT DOCUMENTS

| | | | |
|---|---|---|---|
| 2003/0210471 A1 | 11/2003 | Mihara et al. | |
| 2008/0144193 A1* | 6/2008 | Adachi | G02B 9/60 359/770 |
| 2008/0316609 A1 | 12/2008 | Robinson | |
| 2009/0009888 A1* | 1/2009 | Asami | G02B 9/34 359/770 |
| 2011/0169912 A1* | 7/2011 | Abe | G02B 13/0045 348/36 |
| 2011/0205635 A1 | 8/2011 | Tang | |
| 2012/0069140 A1 | 3/2012 | Tsai | |
| 2012/0307382 A1 | 12/2012 | Hsu | |
| 2014/0247509 A1* | 9/2014 | Tsai | G02B 13/0045 359/714 |
| 2015/0168675 A1* | 6/2015 | Lee | G02B 9/60 348/374 |

FOREIGN PATENT DOCUMENTS

| | | |
|---|---|---|
| JP | 4197994 | 12/2008 |
| TW | M355384 | 4/2009 |
| TW | M356114 | 5/2009 |
| TW | M385700 | 8/2010 |

* cited by examiner

| f(Focus)= 1.438mm, HFOV(Half angular field of view)= 61.00deg., System length=19.162mm, Image height= 2.86mm, Fno=2.40 ||||||||
|---|---|---|---|---|---|---|---|
| Surface # | | Radius | Thickness | Refractive index | Abbe number | Focus | Material |
| - | Object | ∞ | 4000.00 | | | | |
| 111 | 1st lens element | 42.493 | 1.500 | 1.545 | 56.114 | -17.049 | plastic |
| 112 | | 7.529 | 2.588 | | | | |
| 121 | 2nd lens element | 8.291 | 1.423 | 1.545 | 56.114 | -3.415 | plastic |
| 122 | | 1.428 | 2.700 | | | | |
| 131 | 3rd lens element | 3.242 | 4.220 | 1.609 | 26.651 | 4.867 | plastic |
| 132 | | -17.541 | 1.403 | | | | |
| 100 | Aperture stop | ∞ | 0.284 | | | | |
| 141 | 4th lens element | -4.550 | 0.702 | 1.545 | 56.114 | 8.571 | plastic |
| 142 | | -2.430 | 0.252 | | | | |
| 151 | 5th lens element | 172.707 | 1.445 | 1.545 | 56.114 | 4.711 | plastic |
| 152 | | -2.598 | 0.792 | | | | |
| 161 | IR cut filter | ∞ | 0.300 | | | | |
| 162 | | ∞ | 1.553 | | | | |
| 170 | Image plane | ∞ | | | | | |

FIG. 4

| Aspherical parameters | | | | | |
|---|---|---|---|---|---|
| Surface # | 111 | 112 | 121 | 122 | 131 |
| K | 0.000E+00 | 0.000E+00 | 0.000E+00 | -1.282E+00 | -1.164E+00 |
| $a_4$ | 4.314E-06 | 3.598E-04 | -6.507E-04 | -1.943E-03 | -1.955E-03 |
| $a_6$ | 0.000E+00 | 0.000E+00 | 0.000E+00 | 0.000E+00 | 1.154E-04 |
| Surface # | 132 | 141 | 142 | 151 | 152 |
| K | 0.000E+00 | 0.000E+00 | 1.494E+00 | 0.000E+00 | -4.640E+00 |
| $a_4$ | 3.469E-03 | -4.178E-02 | 1.111E-02 | 2.074E-02 | -7.698E-03 |
| $a_6$ | -1.788E-05 | -4.219E-03 | 0.000E+00 | -8.957E-04 | 4.344E-03 |

FIG. 5

| f(Focus)= 1.490mm, HFOV(Half angular field of view)= 60.14deg., System length= 19.677mm, Image height= 2.86mm, Fno=2.40 ||||||||
|---|---|---|---|---|---|---|---|
| Surface # | | Radius | Thickness | Refractive index | Abbe number | Focus | Material |
| - | Object | ∞ | 4000.00 | | | | |
| 211 | 1st lens element | 49.454 | 1.500 | 1.545 | 56.114 | -15.701 | plastic |
| 212 | | 7.216 | 2.765 | | | | |
| 221 | 2nd lens element | 8.540 | 0.900 | 1.545 | 56.114 | -3.196 | plastic |
| 222 | | 1.393 | 2.256 | | | | |
| 231 | 3rd lens element | 2.909 | 5.310 | 1.609 | 26.651 | 4.590 | plastic |
| 232 | | -22.190 | 1.010 | | | | |
| 200 | Aperture stop | ∞ | 0.373 | | | | |
| 241 | 4th lens element | -8.847 | 1.494 | 1.545 | 56.114 | 4.973 | plastic |
| 242 | | -2.198 | 0.200 | | | | |
| 251 | 5th lens element | -26.868 | 1.322 | 1.545 | 56.114 | 7.373 | plastic |
| 252 | | -3.556 | 0.787 | | | | |
| 261 | IR cut filter | ∞ | 0.300 | | | | |
| 262 | | ∞ | 1.460 | | | | |
| 270 | Image plane | ∞ | | | | | |

FIG. 8

| Aspherical parameters | | | | | |
|---|---|---|---|---|---|
| Surface # | 211 | 212 | 221 | 222 | 231 |
| K | 0.000E+00 | 0.000E+00 | 0.000E+00 | -1.291E+00 | -1.073E+00 |
| $a_4$ | 2.562E-05 | 3.060E-04 | -7.499E-04 | -2.212E-03 | -2.396E-03 |
| $a_6$ | 0.000E+00 | 0.000E+00 | 0.000E+00 | 0.000E+00 | 1.231E-04 |
| Surface # | 232 | 241 | 242 | 251 | 252 |
| K | 0.000E+00 | 0.000E+00 | 1.298E-01 | 0.000E+00 | -5.510E+00 |
| $a_4$ | 5.562E-03 | -2.322E-02 | 1.861E-02 | 1.358E-02 | -6.626E-03 |
| $a_6$ | -9.173E-05 | 3.024E-03 | 0.000E+00 | -4.913E-04 | 1.949E-03 |

FIG. 9

| f(Focus)= 1.438mm, HFOV(Half angular field of view)=61.00deg., System length= 19.589mm, Image height= 2.86mm, Fno=2.40 ||||||||
|---|---|---|---|---|---|---|---|
| Surface # | | Radius | Thickness | Refractive index | Abbe number | Focus | Material |
| - | Object | ∞ | 4000.00 | | | | |
| 311 | 1st lens element | 50.434 | 1.500 | 1.545 | 56.114 | -16.602 | plastic |
| 312 | | 7.590 | 2.984 | | | | |
| 321 | 2nd lens element | 9.032 | 0.900 | 1.545 | 56.114 | -3.319 | plastic |
| 322 | | 1.454 | 2.632 | | | | |
| 331 | 3rd lens element | 3.018 | 4.849 | 1.609 | 26.651 | 4.759 | plastic |
| 332 | | -28.674 | 1.191 | | | | |
| 300 | Aperture stop | ∞ | 0.323 | | | | |
| 341 | 4th lens element | -3.646 | 0.824 | 1.545 | 56.114 | 6.168 | plastic |
| 342 | | -1.888 | 0.493 | | | | |
| 351 | 5th lens element | 134.153 | 1.526 | 1.545 | 56.114 | 5.410 | plastic |
| 352 | | -3.002 | 0.708 | | | | |
| 361 | IR cut filter | ∞ | 0.300 | | | | |
| 362 | | ∞ | 1.359 | | | | |
| 370 | Image plane | ∞ | | | | | |

FIG. 12

| Aspherical parameters | | | | | |
|---|---|---|---|---|---|
| Surface # | 311 | 312 | 321 | 322 | 331 |
| K | 0.000E+00 | 0.000E+00 | 0.000E+00 | -1.335E+00 | -1.012E+00 |
| $a_4$ | 2.884E-05 | 3.704E-04 | -6.840E-04 | -1.854E-03 | -2.325E-03 |
| $a_6$ | 0.000E+00 | 0.000E+00 | 0.000E+00 | 0.000E+00 | 1.123E-04 |
| Surface # | 332 | 341 | 342 | 351 | 352 |
| K | 0.000E+00 | 0.000E+00 | 3.779E-01 | 0.000E+00 | -5.379E+00 |
| $a_4$ | 4.251E-03 | -4.708E-02 | 7.026E-03 | 1.357E-02 | -4.609E-03 |
| $a_6$ | -8.595E-05 | -7.326E-03 | 0.000E+00 | -3.773E-04 | 1.894E-03 |

FIG. 13

| \multicolumn{7}{c}{f(Focus)= 1.438mm, HFOV(Half angular field of view)= 61.00 deg., System length= 20.500mm, Image height= 2.86mm, Fno=2.40} |
|---|---|---|---|---|---|---|---|
| Surface # | | Radius | Thickness | Refractive index | Abbe number | Focus | Material |
| - | Object | ∞ | 4000.00 | | | | |
| 411 | 1st lens element | 59.756 | 1.500 | 1.545 | 56.114 | -16.568 | plastic |
| 412 | | 7.774 | 3.011 | | | | |
| 421 | 2nd lens element | 8.806 | 1.859 | 1.545 | 56.114 | -3.219 | plastic |
| 422 | | 1.354 | 2.262 | | | | |
| 431 | 3rd lens element | 2.904 | 4.983 | 1.609 | 26.651 | 4.554 | plastic |
| 432 | | -21.663 | 1.144 | | | | |
| 400 | Aperture stop | ∞ | 0.324 | | | | |
| 441 | 4th lens element | -3.578 | 0.806 | 1.545 | 56.114 | 6.917 | plastic |
| 442 | | -1.981 | 0.303 | | | | |
| 451 | 5th lens element | 13.295 | 2.012 | 1.545 | 56.114 | 5.042 | plastic |
| 452 | | -3.278 | 0.711 | | | | |
| 461 | IR cut filter | ∞ | 0.300 | | | | |
| 462 | | ∞ | 1.285 | | | | |
| 470 | Image plane | ∞ | | | | | |

FIG. 16

| Aspherical parameters | | | | | |
|---|---|---|---|---|---|
| Surface # | 411 | 412 | 421 | 422 | 431 |
| K | 0.000E+00 | 0.000E+00 | 0.000E+00 | -1.312E+00 | -1.079E+00 |
| $a_4$ | 3.186E-05 | 2.376E-04 | -7.300E-04 | -2.045E-03 | -2.502E-03 |
| $a_6$ | 0.000E+00 | 0.000E+00 | 0.000E+00 | 0.000E+00 | 1.328E-04 |
| Surface # | 432 | 441 | 442 | 451 | 452 |
| K | 0.000E+00 | 0.000E+00 | 5.764E-01 | 0.000E+00 | -6.022E+00 |
| $a_4$ | 4.934E-03 | -4.469E-02 | 4.549E-03 | 1.050E-02 | -1.123E-03 |
| $a_6$ | -8.475E-05 | -6.970E-03 | 0.000E+00 | -5.835E-04 | 1.294E-03 |

FIG. 17

| f(Focus)= 1.205mm, HFOV(Half angular field of view)=66.12deg., System length= 19.852mm, Image height= 2.86mm, Fno=2.40 |||||||
|---|---|---|---|---|---|---|---|
| Surface # | | Radius | Thickness | Refractive index | Abbe number | Focus | Material |
| - | Object | ∞ | 4000.00 | | | | |
| 511 | 1st lens element | 54.267 | 1.500 | 1.545 | 56.114 | -17.000 | plastic |
| 512 | | 7.836 | 3.189 | | | | |
| 521 | 2nd lens element | 9.095 | 1.693 | 1.545 | 56.114 | -3.115 | plastic |
| 522 | | 1.337 | 2.586 | | | | |
| 531 | 3rd lens element | 3.182 | 4.716 | 1.609 | 26.651 | 4.787 | plastic |
| 532 | | -15.279 | 0.995 | | | | |
| 500 | Aperture stop | ∞ | 0.232 | | | | |
| 541 | 4th lens element | -3.712 | 0.776 | 1.545 | 56.114 | 5.745 | plastic |
| 542 | | -1.823 | 0.438 | | | | |
| 551 | 5th lens element | -93.294 | 1.491 | 1.545 | 56.114 | 4.858 | plastic |
| 552 | | -2.589 | 0.681 | | | | |
| 561 | IR cut filter | ∞ | 0.300 | | | | |
| 562 | | ∞ | 1.255 | | | | |
| 570 | Image plane | ∞ | | | | | |

FIG. 20

| Aspherical parameters | | | | | |
|---|---|---|---|---|---|
| Surface # | 511 | 512 | 521 | 522 | 531 |
| K | 0.000E+00 | 0.000E+00 | 0.000E+00 | -1.286E+00 | -1.190E+00 |
| $a_4$ | 3.417E-05 | 1.410E-04 | -7.760E-04 | -2.169E-03 | -2.683E-03 |
| $a_6$ | 0.000E+00 | 0.000E+00 | 0.000E+00 | 0.000E+00 | 1.509E-04 |
| Surface # | 532 | 541 | 542 | 551 | 552 |
| K | 0.000E+00 | 0.000E+00 | 7.293E-01 | 0.000E+00 | -4.725E+00 |
| $a_4$ | 4.878E-03 | -5.074E-02 | 1.645E-02 | 1.774E-02 | -4.534E-03 |
| $a_6$ | -8.848E-05 | -1.815E-02 | 0.000E+00 | -8.859E-04 | 3.012E-03 |

FIG. 21

| f(Focus)= 1.131mm, HFOV(Half angular field of view)= 70.39deg., System length= 23.260mm, Image height= 2.86mm, Fno=2.40 |||||||
|---|---|---|---|---|---|---|---|
| Surface # | | Radius | Thickness | Refractive index | Abbe number | Focus | Material |
| - | Object | ∞ | 4000.00 | | | | |
| 611 | 1st lens element | 61030.470 | 1.500 | 1.545 | 56.114 | -15.439 | plastic |
| 612 | | 8.411 | 3.850 | | | | |
| 621 | 2nd lens element | 13.488 | 1.864 | 1.545 | 56.114 | -3.645 | plastic |
| 622 | | 1.647 | 3.628 | | | | |
| 631 | 3rd lens element | 3.629 | 4.891 | 1.609 | 26.651 | 5.382 | plastic |
| 632 | | -16.614 | 1.690 | | | | |
| 600 | Aperture stop | ∞ | 0.222 | | | | |
| 641 | 4th lens element | -3.751 | 0.892 | 1.545 | 56.114 | 6.399 | plastic |
| 642 | | -1.959 | 0.856 | | | | |
| 651 | 5th lens element | -33.648 | 2.053 | 1.545 | 56.114 | 3.747 | plastic |
| 652 | | -1.967 | 0.470 | | | | |
| 661 | IR cut filter | ∞ | 0.300 | | | | |
| 662 | | ∞ | 1.044 | | | | |
| 670 | Image plane | ∞ | | | | | |

FIG. 24

| Aspherical parameters | | | | | |
|---|---|---|---|---|---|
| Surface # | 611 | 612 | 621 | 622 | 631 |
| K | 0.000E+00 | 0.000E+00 | 0.000E+00 | -1.499E+00 | -1.076E+00 |
| $a_4$ | 2.392E-05 | 1.377E-04 | -3.934E-04 | -1.215E-03 | -1.230E-03 |
| $a_6$ | 0.000E+00 | 0.000E+00 | 0.000E+00 | 0.000E+00 | 5.006E-05 |
| Surface # | 632 | 641 | 642 | 651 | 652 |
| K | 0.000E+00 | 0.000E+00 | 1.413E-01 | 0.000E+00 | -3.295E+00 |
| $a_4$ | 2.209E-03 | -2.765E-02 | 1.876E-02 | 1.688E-02 | 8.253E-06 |
| $a_6$ | -2.360E-05 | 3.970E-03 | 0.000E+00 | -1.051E-03 | 1.243E-03 |

FIG. 25

| f(Focus)= 2.20mm, HFOV(Half angular field of view)=49.73deg., System length= 19.478mm, Image height= 2.86mm, Fno=2.40 |||||||
|---|---|---|---|---|---|---|---|
| Surface # | | Radius | Thickness | Refractive index | Abbe number | Focus | Material |
| - | Object | ∞ | 4000.00 | | | | |
| 711 | 1st lens element | -6439.103 | 1.500 | 1.545 | 56.114 | -75.329 | plastic |
| 712 | | 41.313 | 2.472 | | | | |
| 721 | 2nd lens element | 8.680 | 1.692 | 1.545 | 56.114 | -3.895 | plastic |
| 722 | | 1.588 | 2.110 | | | | |
| 731 | 3rd lens element | 3.109 | 5.014 | 1.609 | 26.651 | 5.818 | plastic |
| 732 | | 9.863 | 0.930 | | | | |
| 700 | Aperture stop | ∞ | 0.229 | | | | |
| 741 | 4th lens element | -8.715 | 1.084 | 1.545 | 56.114 | 4.678 | plastic |
| 742 | | -2.059 | 0.366 | | | | |
| 751 | 5th lens element | 30.536 | 0.878 | 1.545 | 56.114 | 8.389 | plastic |
| 752 | | -5.321 | 0.711 | | | | |
| 761 | IR cut filter | ∞ | 0.300 | | | | |
| 762 | | ∞ | 2.192 | | | | |
| 770 | Image plane | ∞ | | | | | |

FIG. 28

| Aspherical parameters | | | | | |
|---|---|---|---|---|---|
| Surface # | 711 | 712 | 721 | 722 | 731 |
| K | 0.000E+00 | 0.000E+00 | 0.000E+00 | -1.148E+00 | -8.996E-01 |
| $a_4$ | 8.338E-05 | 5.468E-04 | 3.405E-04 | -1.560E-04 | -1.982E-03 |
| $a_6$ | 0.000E+00 | 0.000E+00 | 0.000E+00 | 0.000E+00 | 6.461E-05 |
| Surface # | 732 | 741 | 742 | 751 | 752 |
| K | 0.000E+00 | 0.000E+00 | 8.787E-01 | 0.000E+00 | -1.427E+01 |
| $a_4$ | 1.256E-02 | -4.240E-02 | -9.052E-03 | 1.723E-03 | 5.008E-03 |
| $a_6$ | 2.232E-03 | -2.177E-02 | 0.000E+00 | 5.937E-04 | -4.195E-05 |

FIG. 29

| f(Focus)= 1.409mm, HFOV(Half angular field of view)=61.50deg., System length=18.327mm, Image height= 2.86mm, Fno=2.40 ||||||||
| Surface # | | Radius | Thickness | Refractive index | Abbe number | Focus | Material |
| --- | --- | --- | --- | --- | --- | --- | --- |
| - | Object | ∞ | 4000.00 | | | | |
| 811 | 1st lens element | 87.537 | 1.500 | 1.545 | 56.114 | -12.631 | plastic |
| 812 | | 6.342 | 1.754 | | | | |
| 821 | 2nd lens element | 6.829 | 0.900 | 1.545 | 56.114 | -3.132 | plastic |
| 822 | | 1.302 | 2.158 | | | | |
| 831 | 3rd lens element | 2.918 | 5.280 | 1.609 | 26.651 | 4.501 | plastic |
| 832 | | -14.316 | 0.772 | | | | |
| 800 | Aperture stop | ∞ | 0.462 | | | | |
| 841 | 4th lens element | 29.256 | 1.834 | 1.545 | 56.114 | 4.430 | plastic |
| 842 | | -2.572 | 0.100 | | | | |
| 851 | 5th lens element | -41.485 | 1.455 | 1.545 | 56.114 | 7.433 | plastic |
| 852 | | -3.736 | 0.619 | | | | |
| 861 | IR cut filter | ∞ | 0.300 | | | | |
| 862 | | ∞ | 1.193 | | | | |
| 870 | Image plane | ∞ | | | | | |

FIG. 32

| Aspherical parameters | | | | | |
|---|---|---|---|---|---|
| Surface # | 811 | 812 | 821 | 822 | 831 |
| K | 0.000E+00 | 0.000E+00 | 0.000E+00 | -1.211E+00 | -1.033E+00 |
| $a_4$ | 2.390E-05 | -4.424E-05 | -9.438E-04 | -1.992E-03 | -2.579E-03 |
| $a_6$ | 0.000E+00 | 0.000E+00 | 0.000E+00 | 0.000E+00 | 1.704E-04 |
| Surface # | 832 | 841 | 842 | 851 | 852 |
| K | 0.000E+00 | 0.000E+00 | -6.606E-01 | 0.000E+00 | -5.059E+00 |
| $a_4$ | 9.477E-03 | 1.140E-04 | 3.085E-02 | 1.610E-02 | -1.069E-02 |
| $a_6$ | -3.216E-04 | 6.603E-03 | 0.000E+00 | -6.347E-04 | 2.171E-03 |

FIG. 33

| Embodiment | 1st Embodiment | 2nd Embodiment | 3rd Embodiment | 4th Embodiment | 5th Embodiment | 6th Embodiment | 7th Embodiment | 8th Embodiment |
|---|---|---|---|---|---|---|---|---|
| T1 | 1.50 | 1.50 | 1.50 | 1.50 | 1.50 | 1.50 | 1.50 | 1.50 |
| G12 | 2.59 | 2.77 | 2.98 | 3.01 | 3.19 | 3.85 | 2.47 | 1.75 |
| T2 | 1.42 | 0.90 | 0.90 | 1.86 | 1.69 | 1.86 | 1.69 | 0.90 |
| G23 | 2.70 | 2.26 | 2.63 | 2.26 | 2.59 | 3.63 | 2.11 | 2.16 |
| T3 | 4.22 | 5.31 | 4.85 | 4.98 | 4.72 | 4.89 | 5.01 | 5.28 |
| G34 | 1.69 | 1.38 | 1.51 | 1.47 | 1.23 | 1.91 | 1.16 | 1.23 |
| T4 | 0.70 | 1.49 | 0.82 | 0.81 | 0.78 | 0.89 | 1.08 | 1.83 |
| G45 | 0.25 | 0.20 | 0.49 | 0.30 | 0.44 | 0.86 | 0.37 | 0.10 |
| T5 | 1.45 | 1.32 | 1.53 | 2.01 | 1.49 | 2.05 | 0.88 | 1.46 |
| BFL | 2.64 | 2.55 | 2.37 | 2.30 | 2.24 | 1.81 | 3.20 | 2.11 |
| AAG | 7.23 | 6.60 | 7.62 | 7.04 | 7.44 | 10.25 | 6.11 | 5.25 |
| ALT | 9.29 | 10.53 | 9.60 | 11.16 | 10.18 | 11.20 | 10.17 | 10.97 |
| TTL | 19.16 | 19.68 | 19.59 | 20.50 | 19.85 | 23.26 | 19.48 | 18.33 |
| EFL | 1.44 | 1.49 | 1.44 | 1.44 | 1.21 | 1.13 | 2.20 | 1.41 |
| ALT/T2 | 6.53 | 11.70 | 10.67 | 6.00 | 6.01 | 6.01 | 6.01 | 12.19 |
| AAG/T5 | 5.00 | 5.00 | 5.00 | 3.50 | 4.99 | 4.99 | 6.96 | 3.61 |
| BFL/T4 | 3.77 | 1.70 | 2.87 | 2.85 | 2.88 | 2.03 | 2.95 | 1.15 |
| AAG/G34 | 4.28 | 4.78 | 5.04 | 4.80 | 6.06 | 5.36 | 5.27 | 4.25 |
| T5/T4 | 2.06 | 0.88 | 1.85 | 2.50 | 1.92 | 2.30 | 0.81 | 0.79 |
| AAG/T3 | 1.71 | 1.24 | 1.57 | 1.41 | 1.58 | 2.09 | 1.22 | 0.99 |
| T3/T4 | 6.01 | 3.55 | 5.88 | 6.18 | 6.08 | 5.48 | 4.63 | 2.88 |
| EFL/T5 | 1.00 | 1.13 | 0.94 | 0.71 | 0.81 | 0.55 | 2.51 | 0.97 |
| T4/T2 | 0.49 | 1.66 | 0.92 | 0.43 | 0.46 | 0.48 | 0.64 | 2.04 |
| T4/G34 | 0.42 | 1.08 | 0.54 | 0.55 | 0.63 | 0.47 | 0.94 | 1.49 |
| AAG/T2 | 5.08 | 7.34 | 8.47 | 3.79 | 4.39 | 5.50 | 3.61 | 5.83 |
| ALT/T4 | 13.23 | 7.05 | 11.65 | 13.85 | 13.11 | 12.56 | 9.38 | 5.98 |
| T3/G12 | 1.63 | 1.92 | 1.63 | 1.65 | 1.48 | 1.27 | 2.03 | 3.01 |

FIG. 34

ELECTRONIC DEVICE AND OPTICAL IMAGING LENS THEREOF

INCORPORATION BY REFERENCE

This application claims priority from R.O.C. Patent Application No. 103102970, filed on Jan. 27, 2014, the contents of which are hereby incorporated by reference in their entirety for all purposes.

TECHNICAL FIELD

The present invention relates to an electronic device and an optical imaging lens thereof, and particularly, relates to an electronic device applying an optical imaging lens having five lens elements and an optical imaging lens thereof.

BACKGROUND

The ever-increasing demand for smaller sized electronic devices, such as cell phones, digital cameras, etc. correspondingly triggered a growing need for a broad application for a photography module, comprising elements such as an optical imaging lens, a module housing unit, and an image sensor, etc., contained therein in the fields of environmental monitoring, vehicle video recording, etc. Further, along with the developments of the electronic devices in size reductions, which include not only the technical progress of the charge coupled device (CCD) and the complementary metal-oxide semiconductor (CMOS), but also the intensified demanding of driving safety, image quality and so on in the market, the requirement for a photography module is not just achieving good optical characteristics, but the field of view (FOV) of the optical imaging lens mounted in a photography module is required for a greater angle and f-number (fno) of the optical imaging lens is required for a smaller value.

U.S. Pat. No. 7,903,349 disclosed an optical imaging lens constructed with a conventional optical imaging lens having five lens elements. The field of view reaches 60 degrees but with an excessive fno, which is 4.0, therefore, such configuration is not able to satisfy current requirements.

Therefore, there is needed to develop optical imaging lens which is capable to place with five lens elements therein, with a broadened field of view, while also having good optical characteristics.

SUMMARY

An object of the present invention is to provide an electronic device and an optical imaging lens thereof. With controlling the convex or concave shape of the surfaces, the configuration of refracting power of some lens elements and an inequality, the FOV of the optical imaging lens is broadened and meanwhile the good optical characteristics, and system functionality are sustained.

In an exemplary embodiment, an optical imaging lens comprises, sequentially from an object side to an image side along an optical axis, comprises first, second, third, fourth and fifth lens elements, each of the first, second, third, fourth and fifth lens elements having refracting power, an object-side surface facing toward the object side and an image-side surface facing toward the image side and a central thickness defined along the optical axis. The first lens element has negative refracting power, the object-side surface of the second lens element comprises a convex portion in a vicinity of a periphery of the second lens element and the image surface of the second lens element comprises a concave portion in the vicinity of a periphery of the second lens element, the object-side surface of the third lens element comprises a convex portion in a vicinity of a periphery of the third lens element, the image-side surface of the fifth lens element comprises a convex portion in a vicinity of a periphery of the fifth lens element, the optical imaging lens comprises no other lenses having refracting power beyond the five lens elements, and the central thickness of the second lens element is represented by T2, a sum of the central thicknesses of all five lens elements is represented by ALT, and T2 and ALT satisfy the equation:

$$6 \leq ALT/T2 \qquad \text{Equation (1)}.$$

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the distance between an aperture stop and the next lens element in the direction to the imaging plane (which is the fourth lens element in the present invention), represented by TA, the central thickness of the fourth lens element, represented by T4, an air gap between the fourth lens element and the fifth lens element along the optical axis, represented by G45, the central thickness of the fifth lens element, represented by T5, a distance between the image-side surface of the fifth lens element and the object-side surface of a filtering unit along the optical axis, represented by G5F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, the refractive index of the first lens element, represented by n1, the refractive index of the second lens element, represented by n2, the refractive index of the third lens element, represented by n3, the refractive index of the fourth lens element, represented by n4, the refractive index of the fifth lens element, represented by n5, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an effective focal length of the optical imaging lens, represented by EFL, the length between the object-side surface of the first lens element and the image plane along the optical axis, represented by TTL, a sum of the central thicknesses of all five lens elements, comprising T1, T2, T3 T4 and T5, represented by ALT, a sum of all four air gaps from the first lens element to the fifth lens element along the optical axis comprising G12, G23 G34 and G45, represented by AAG, and a back focal length of the optical imaging lens, which is defined as the distance from the image-side surface of the fifth lens element to the image plane along the optical axis comprising G5F, TF and GFP and represented by BFL.

In some exemplary embodiments, more details about the convex or concave surface structure and/or the configuration of positive or negative refracting power could be incorporated for one specific lens element or broadly for plural lens elements to enhance the control for the system performance and/or resolution. It is noted that the details listed here could be incorporated in example embodiments if no inconsistency occurs.

In another exemplary embodiment, an electronic device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and/or the refraction power of the lens element(s), the electronic device and the optical imaging lens thereof in exemplary embodiments achieve good optical characteristics and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of an eighth embodiment of the present disclosure;

FIG. 33 is a table of aspherical data of an eighth embodiment of the optical imaging lens according to the present disclosure;

FIG. 34 is a table for the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 of all eight example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
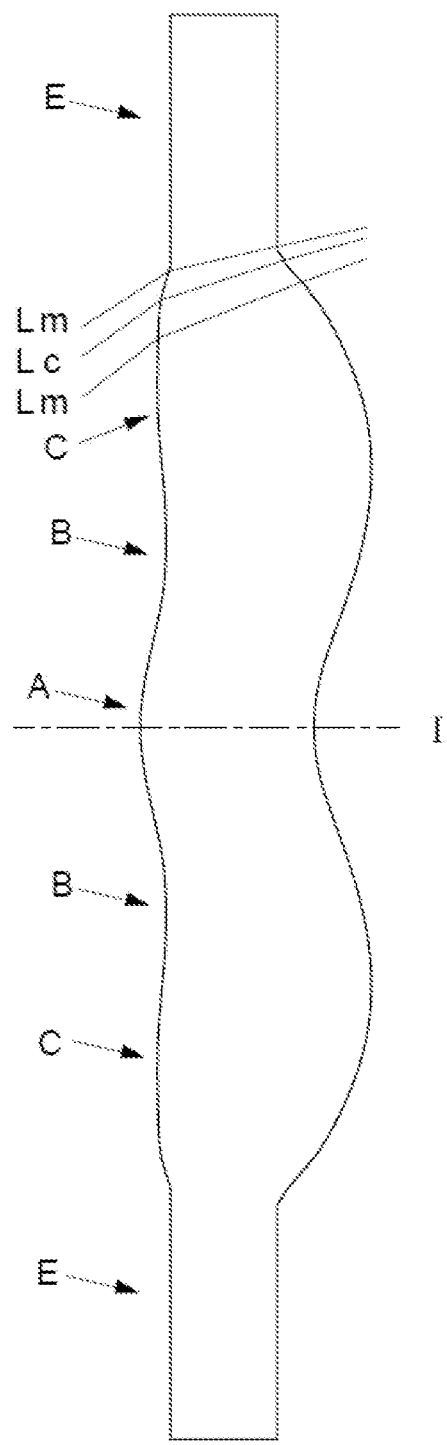
FIG. 1 is a cross-sectional view of one single lens element according to the present disclosure.

Here in the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, a second lens element, a third lens element, a fourth lens element and a fifth lens element, each of the lens elements comprises refracting power, an object-side surface facing toward an object side and an image-side surface facing toward an image side and a central thickness defined along the optical axis. These lens elements may be arranged sequentially from the object side to the image side along an optical axis, and example embodiments of the lens may comprise no other lenses having refracting power beyond the five lens elements. In an example embodiment: the first lens element has negative refracting power, the object-side surface of the second lens element comprises a convex portion in a vicinity of a periphery of the second lens element and the image surface of the second lens element comprises a concave portion in the vicinity of a periphery of the second lens element, the object-side surface of the third lens element comprises a convex portion in a vicinity of a periphery of the third lens element, the image-side surface of the fifth lens element comprises a convex portion in a vicinity of a periphery of the fifth lens element, the optical imaging lens comprises no other lenses having refracting power beyond the five lens elements, and the central thickness of the second lens element is represented by T2, a sum of the central thicknesses of all five lens elements is represented by ALT, and T2 and ALT satisfy the equation:

$$6 \leq ALT/T2 \qquad \text{Equation (1).}$$

Preferably, the lens elements are designed in light of the optical characteristics and the FOV of the optical imaging lens. For example, the first lens element having negative refracting power is able to collect the light incident with great angle to enlarge the FOV. Combining this with the details of shape on the surfaces of the lens elements listed here, such as the convex portion in a vicinity of a periphery of the second lens element formed on the object-side surface thereof, the concave portion in the vicinity of a periphery of the second lens element formed on the image-side surface thereof, the convex portion in a vicinity of a periphery of the third lens element formed on the object-side surface thereof and the convex portion in a vicinity of a periphery of the fifth lens element formed on the image-side surface thereof, the aberration of the optical imaging lens could be further adjusted to promote the imaging quality of the optical imaging lens.

In an exemplary embodiment, the first lens element has negative refracting power, the object-side surface of the second lens element comprises a convex portion in a vicinity of a periphery of the second lens element and the image surface of the second lens element comprises a concave portion in the vicinity of a periphery of the second lens element, the object-side surface of the third lens element comprises a convex portion in a vicinity of a periphery of the third lens element, the image-side surface of the fifth lens element comprises a convex portion in a vicinity of a periphery of the fifth lens element, the optical imaging lens comprises no other lenses having refracting power beyond the five lens elements, and the central thickness of the second lens element is represented by T2, a sum of the central thicknesses of all five lens elements is represented by ALT, and T2 and ALT satisfy the equation:

$$6 \leq ALT/T2 \qquad \text{Equation (1).}$$

In another exemplary embodiment, other equation(s), such as those relating to the ratio among parameters could be taken into consideration. For example, T5 and AAG could be controlled to satisfy the equation as follows:

$$AAG/T5 \leq 7 \qquad \text{Equation (2); or}$$

T4 and BFL could be controlled to satisfy the equation as follows:

$$1.7 \leq BFL/T4 \qquad \text{Equation (3); or}$$

G34 and AAG could be controlled to satisfy the equation as follows:

$$AAG/G34 \leq 7 \qquad \text{Equation (4); or}$$

T4 and T5 could be controlled to satisfy the equation as follows:

$$0.75 \leq T5/T4 \qquad \text{Equation (5); or}$$

T3 and AAG could be controlled to satisfy the equation as follows:

$$AAG/T3 \leq 2.3 \qquad \text{Equation (6); or}$$

T3 and T4 could be controlled to satisfy the equation as follows:

$$2.00 \leq T3/T4 \qquad \text{Equation (7); or}$$

T5 and EFL could be controlled to satisfy the equation as follows:

$$EFL/T5 \leq 3 \qquad \text{Equation (8); or}$$

T2 and T4 could be controlled to satisfy the equation as follows:

$$T4/T2 \leq 2.05 \qquad \text{Equation (9); or}$$

T4 and G34 could be controlled to satisfy the equation as follows:

$$T4/G34 \leq 1.5 \qquad \text{Equation (10); or}$$

T2 and AAG could be controlled to satisfy the equation as follows:

$$AAG/T2 \leq 8.5 \qquad \text{Equation (11); or}$$

T4 and ALT could be controlled to satisfy the equation as follows:

$$5 \leq ALT/T4 \qquad \text{Equation (12); or}$$

T3 and G12 could be controlled to satisfy the equation as follows:

$$1.1 \leq T3/G12 \leq 3.5 \qquad \text{Equation (13).}$$

Aforesaid exemplary embodiments are not limited and could be selectively incorporated in other embodiments described herein.

In another exemplary embodiment, some equation(s) of parameters, such as those relating to the ratio among parameters could be taken into consideration. For example, T5 and AAG could be controlled to satisfy the equation as follows:

$$AAG/T5 \leq 7 \qquad \text{Equation (2); or}$$

T4 and BFL could be controlled to satisfy the equation as follows:

$$1.7 \leq BFL/T4 \qquad \text{Equation (3); or}$$

G34 and AAG could be controlled to satisfy the equation as follows:

$$AAG/G34 \leq 7 \qquad \text{Equation (4); or}$$

T4 and T5 could be controlled to satisfy the equation as follows:

$$0.75 \leq T5/T4 \qquad \text{Equation (5); or}$$

T3 and AAG could be controlled to satisfy the equation as follows:

$$AAG/T3 \leq 2.3 \qquad \text{Equation (6); or}$$

T3 and T4 could be controlled to satisfy the equation as follows:

$$2.00 \leq T3/T4 \qquad \text{Equation (7); or}$$

T5 and EFL could be controlled to satisfy the equation as follows:

$$EFL/T5 \leq 3 \qquad \text{Equation (8); or}$$

T2 and T4 could be controlled to satisfy the equation as follows:

$$T4/T2 \leq 2.05 \qquad \text{Equation (9); or}$$

T4 and G34 could be controlled to satisfy the equation as follows:

$$T4/G34 \leq 1.5 \qquad \text{Equation (10); or}$$

T2 and AAG could be controlled to satisfy the equation as follows:

$$AAG/T2 \leq 8.5 \qquad \text{Equation (11); or}$$

T4 and ALT could be controlled to satisfy the equation as follows:

$$5 \leq ALT/T4 \qquad \text{Equation (12); or}$$

T3 and G12 could be controlled to satisfy the equation as follows:

$$1.1 \leq T3/G12 \leq 3.5 \qquad \text{Equation (13).}$$

Aforesaid exemplary embodiments are not limited and could be selectively incorporated in other embodiments described herein.

Aforesaid equations are designed in light of the observation on the variety of each parameter, optical characteristics and the changing of the view angle for achieving feasible optical imaging lenses with good optical characteristics and wide shot angle. The observations comprises: shortening EFL may facilitate the enlarging of the view angle, the value of EFL is varied with the thickness of each lens element and the size of each air gap, wide-angle lenses encounter greater distortion easily to degrade the imaging quality of the optical imaging lenses. Therefore, it is important to design the shape and thickness of each lens and the size of each air gap and combine them for effectively enlarging the view angle and sustaining good imaging quality.

Above Equations (1), (5), (7), (9) and (12) relate to a ratio of the thickness of each lens element or a single lens element to the sum of the thicknesses of all lens elements, ALT. When satisfying these equations, the thickness of all lens elements may be configured in a good way to facilitate manufacturing process, enlarging view angle and satisfying the request of good imaging quality. According to above Equations (5), (7) and (9), T2, T3 and T5 preferably tend to a relative great value, and ALT is the sum of T1~T5, therefore these make ALT relative great. According to above Equations (1) and (12), it is clear that the value of ALT increases in a faster ratio than that of T2 and T4. Please noted that here the mentioned increasing ratio has a relative meaning, which is obtained by comparison, and not in an absolute scale.

Specifically, for ALT/T2 in Equation (1), because the increasing ratio of ALT is preferably greater than that of T2, ALT/T2 tends to a greater value. More preferably, ALT/T2 may be limited by an upper limit, as follows:

$$6 \leq ALT/T2 \leq 13.00 \qquad \text{Equation (1').}$$

For T5/T4 in Equation (5), because the increasing ratio of T5 is preferably greater than that of T4, T5/T4 tends to a greater value. More preferably, T5/T4 may be limited by an upper limit, as follows:

$$0.75 \leq T5/T4 \leq 3.00 \qquad \text{Equation (5').}$$

For T3/T4 in Equation (7), because the increasing ratio of T3 is preferably greater than that of T4, T3/T4 tends to a greater value. More preferably, T3/T4 may be limited by an upper limit, as follows:

$$2.00 \leq T3/T4 \leq 7.00 \qquad \text{Equation (7')}.$$

For T4/T2 in Equation (9), because the increasing ratio of T2 is preferably greater than that of T4, T4/T2 tends to a greater value. More preferably, T4/T2 may be limited by a lower limit, as follows:

$$0.10 \leq T4/T2 \leq 2.05 \qquad \text{Equation (9')}.$$

For ALT/T4 in Equation (12), because the increasing ratio of ALT is preferably greater than that of T4, ALT/T4 tends to a greater value. More preferably, ALT/T4 may be limited by an upper limit, as follows:

$$5.00 \leq ALT/T4 \leq 14.50 \qquad \text{Equation (12')}.$$

Reference is now made to Equations (2), (4), (6), (10), (11) and (13). Considering that the width of an air gap along the optical axis effects the difficulty of the assembly process and the height of the light entering the adjacent lens element, here these equations are designed to prevent from undesired excessive length of the optical imaging lens and reduce the difficulty in the assembly process. The value of AAG/T5 is suggested for an upper limit, such as 7 to satisfy Equation (2), and preferably, it is suggested to be within 3.00~7.00, the value of AAG/G34 is suggested for an upper limit, such as 7 to satisfy Equation (4), and preferably, it is suggested to be within 3.80~7, the value of AAG/T3 is suggested for an upper limit, such as 2.3 to satisfy Equation (6), and preferably, it is suggested to be within 0.50~2.3, the value of T4/G34 is suggested for an upper limit, such as 1.5 to satisfy Equation (10), and preferably, it is suggested to be within 0.10~1.5, and the value of AAG/T2 is suggested for an upper limit, such as 8.5 to satisfy Equation (11), and preferably, it is suggested to be within 3.00~8.5.

Reference is now made to Equations (3) and (8). Considering that the shortening of EFL facilitates the broadening of HOV as well as the shortening of BFL, here these equations are designed to prevent from undesired extreme small BFL and broaden the FOV. Here, the value of BFL/T4 is suggested for a lower limit, such as 1.7 to satisfy Equation (3), and preferably, it is suggested to be within 1.7~4.20, and the value of EFL/T5 is suggested for an upper limit, such as 3 to satisfy Equation (8), and preferably, it is suggested to be within 0.20~3.00.

In light of the unpredictability in an optical system, in the present invention, satisfying these equations listed above may preferably shortening the length of the optical imaging lens, lowering the f-number, enlarging the shot angle, promoting the imaging quality and/or increasing the yield in the assembly process.

When implementing example embodiments, more details about the convex or concave surface and/or the configuration of positive or negative refracting power could be incorporated for one specific lens element or broadly for plural lens elements to enhance the control for the system performance and/or resolution. It is noted that the details listed here could be incorporated in example embodiments if no inconsistency occurs.

Figure 2:
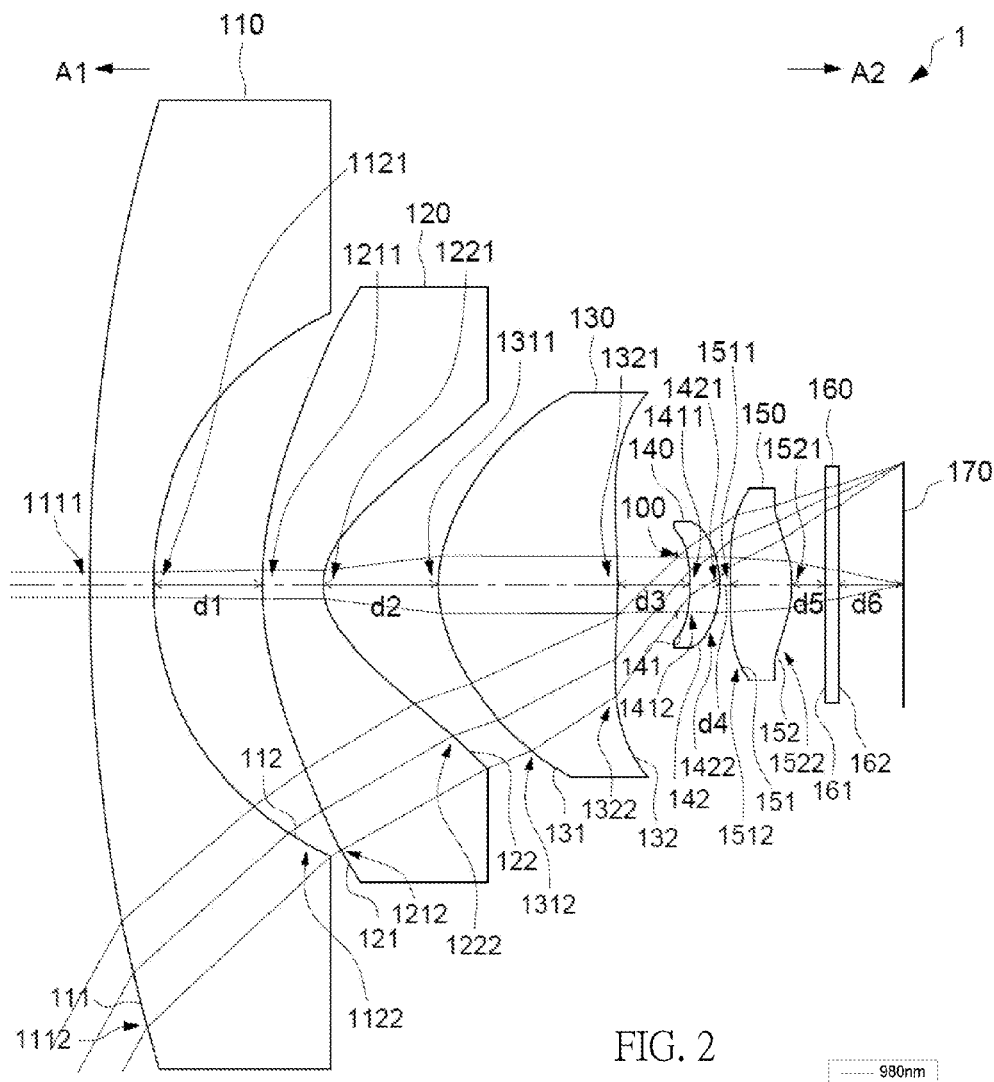
FIG. 2 is a cross-sectional view of a first embodiment of an optical imaging lens having five lens elements according to the present disclosure.
Figure 3:
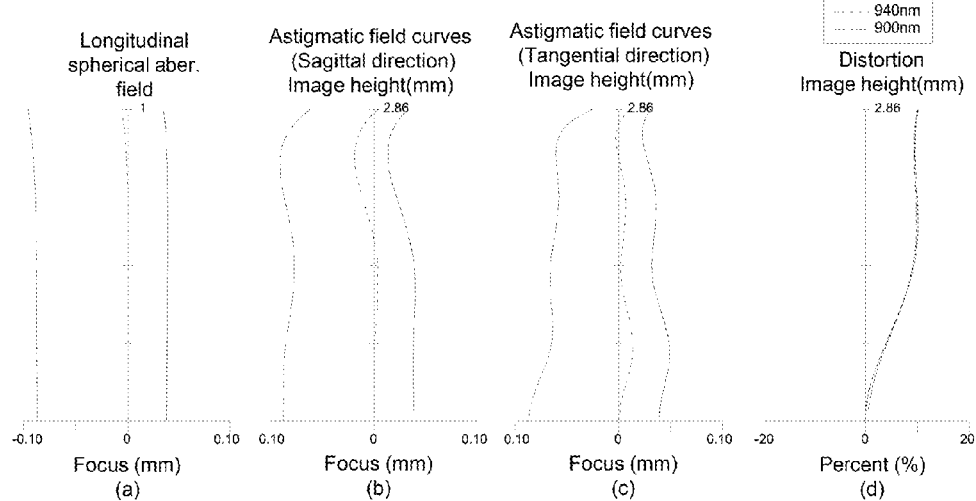
FIG. 3 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a broadened FOV. Reference is now made to FIGS. 2-5. FIG. 2 illustrates an example cross-sectional view of an optical imaging lens 1 having five lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, a first lens element 110, a second lens element 120, a third lens element 130, an aperture stop 100, a fourth lens element 140 and a fifth lens element 150. A filtering unit 160 and an image plane 170 of an image sensor are positioned at the image side A2 of the optical lens 1. Each of the first, second, third, fourth, fifth lens elements 110, 120, 130, 140, 150 and the filtering unit 160 comprises an object-side surface 111/121/131/141/151/161 facing toward the object side A1 and an image-side surface 112/122/132/142/152/162 facing toward the image side A2. The example embodiment of the filtering unit 160 illustrated is an IR cut filter (infrared cut filter) positioned between the fifth lens element 150 and an image plane 170. The filtering unit 160 selectively absorbs light with specific wavelength from the light passing optical imaging lens 1. For example, IR light is absorbed, and this will prohibit the IR light which is not seen by human eyes from producing an image on the image plane 170.

Exemplary embodiments of each lens element of the optical imaging lens 1 which may be constructed by plastic material will now be described with reference to the drawings.

An example embodiment of the first lens element 110 has negative refracting power. The object-side surface 111 is a convex surface comprising a convex portion 1111 in a vicinity of the optical axis and a convex portion 1112 in a vicinity of a periphery of the first lens element 110. The image-side surface 112 is a concave surface comprising a concave portion 1121 in the vicinity of the optical axis and a concave portion 1122 in the vicinity of the periphery of the first lens element 110.

An example embodiment of the second lens element 120 has negative refracting power. The object-side surface 121 is a convex surface comprising a convex portion 1211 in a vicinity of the optical axis and a convex portion 1212 in a vicinity of a periphery of the second lens element 120. The image-side surface 122 is a concave surface comprising a concave portion 1221 in the vicinity of the optical axis and a concave portion 1222 in the vicinity of the periphery of the second lens element 120.

An example embodiment of the third lens element 130 has positive refracting power. The object-side surface 131 is a convex surface comprising a convex portion 1311 in a vicinity of the optical axis and a convex portion 1312 in a vicinity of a periphery of the third lens element 130. The image-side surface 132 comprises a convex portion 1321 in the vicinity of the optical axis and a concave portion 1322 in the vicinity of the periphery of the third lens element 130.

An example embodiment of the fourth lens element 140 has positive refracting power. The object-side surface 141 is a concave surface comprising a concave portion 1411 in a vicinity of the optical axis and a concave portion 1412 in a vicinity of a periphery of the fourth lens element 140. The image-side surface 142 is a convex surface comprising a convex portion 1421 in the vicinity of the optical axis and a convex portion 1422 in the vicinity of the periphery of the fourth lens element 140.

An example embodiment of the fifth lens element 150 has positive refracting power. The object-side surface 151 is a convex surface comprising a convex portion 1511 in a vicinity of the optical axis and a convex portion 1512 in a vicinity of a periphery of the fifth lens element 150. The image-side surface 152 is a convex surface comprising a convex portion 1521 in the vicinity of the optical axis and a convex portion 1522 in the vicinity of the periphery of the fifth lens element 150.

In example embodiments, air gaps exist between the lens elements 110, 120, 130, 140, 150, the filtering unit 160 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160 and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45, the air gap d5 is denoted by G5F, the air gap d6 is denoted by GFP and the sum of G12, G23, G34 and G45 is denoted by AAG.

FIG. 4 depicts the optical characteristics of each lens elements in the optical imaging lens 1 of the present embodiment, wherein the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 are:

$ALT/T2=6.53;$ $AAG/T5=5.00;$ $BFL/T4=3.77;$ $AAG/G34=4.28;$ $T5/T4=2.06;$ $AAG/T3=1.71;$ $T3/T4=6.01;$ $EFL/T5=1.00;$ $T4/T2=0.49;$ $T4/G34=0.42;$ $AAG/T2=5.08;$ $ALT/T4=13.23;$ $T3/G12=1.63.$

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150 are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.10 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.10 mm. This reflects the optical imaging lens 1 of the present embodiment eliminates aberration effectively. Additionally, the closed curves represents dispersion is improved.

Please refer to FIG. 3, distortion aberration (d), which showing the variation of the distortion aberration is within ±10%.

Accordingly, the optical imaging lens 1 of the present embodiment shows good characteristics in the longitudinal spherical aberration, astigmatism in the sagittal direction, astigmatism in the tangential direction, and distortion aberration, and the optical imaging lens 1 is capable to provide good imaging quality with 61.00 degrees of half field of view (HFOV) and 2.40 of Fno. Therefore, the optical imaging lens 1 of the example embodiment indeed achieves great optical performance and the FOV of the optical imaging lens 1 is effectively broadened. Please note that the length of the optical imaging lens 1 which is from the object-side surface 111 to the image plane 170 is 19.16 mm.

Figure 6:
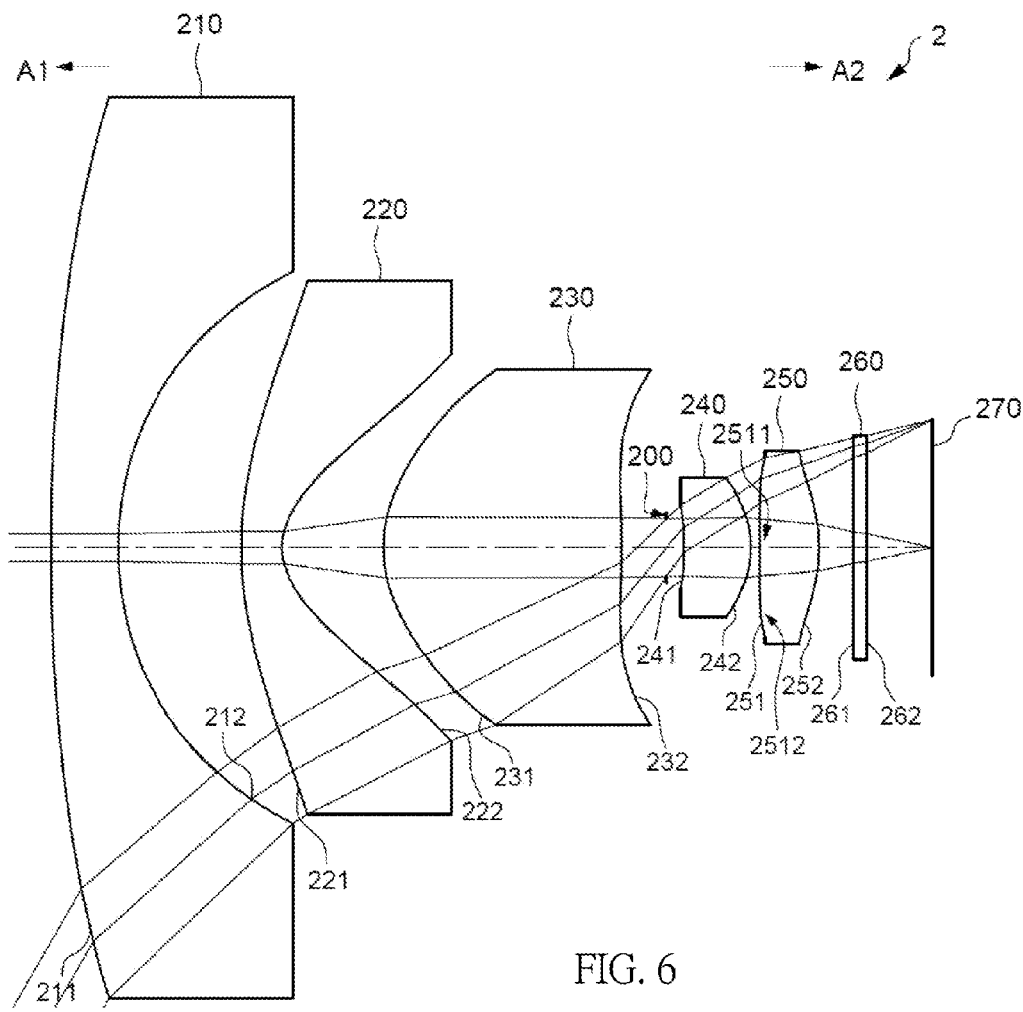
FIG. 6 is a cross-sectional view of a second embodiment of an optical imaging lens having five lens elements according to the present disclosure.
Figure 7:
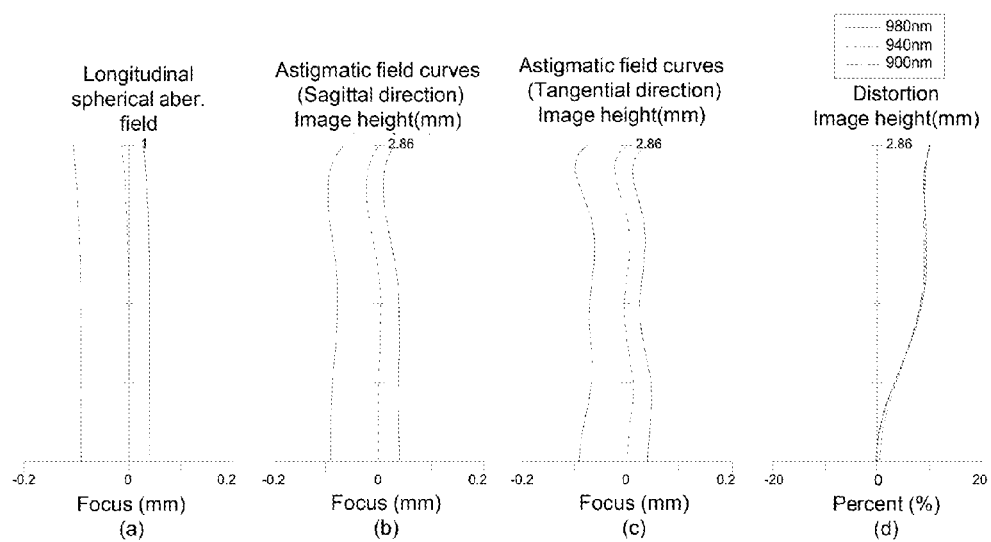
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises a first lens element 210, a second lens element 220, a third lens element 230, an aperture stop 200, a fourth lens element 240 and a fifth lens element 250.

The differences between the second embodiment and the first embodiment are the radius of curvature and thickness of each lens element, the distance of each air gap and the configuration of the concave/convex shape of the object-side surface 251, but the configuration of the positive/negative refracting power of the first, second, third, fourth and fifth lens elements 210, 220, 230, 240, 250 and configuration of the concave/convex shape of surfaces, comprising the object-side surfaces 211, 221, 231, 241 facing to the object side A1 and the image-side surfaces 212, 222, 232, 242, 252 facing to the image side A2, are similar to those in the first embodiment. Here, for clearly showing the drawings of the present embodiment, only the surface shapes which are different from that in the first embodiment are labeled. Specifically, the object-side surface 251 of the fifth lens element 250 comprises a concave portion 2511 in a vicinity of the optical axis and a convex portion 2512 in a vicinity of a periphery of the fifth lens element 250. Please refer to FIG. 8 for the optical characteristics of each lens elements in the optical imaging lens 2 the present embodiment, the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 are:

$AAG/T5=5.00$;

$BFL/T4=1.70$;

$AAG/G34=4.78$;

$T5/T4=0.88$;

$AAG/T3=1.24$;

$T3/T4=3.55$;

$EFL/T5=1.13$;

$T4/T2=1.66$;

$T4/G34=1.08$;

$AAG/T2=7.34$;

$ALT/T4=7.05$;

$T3/G12=1.92$.

The distance from the object-side surface 211 of the first lens element 210 to the image plane 270 along the optical axis is 19.68 mm, the Fno is 2.40 and the HFOV is 60.14 degrees. Thus, the optical imaging lens 2 is capable to provide excellent imaging quality.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 2 of the present embodiment indeed shows great optical performance and the FOV of the optical imaging lens 2 is effectively broadened.

Figure 10:
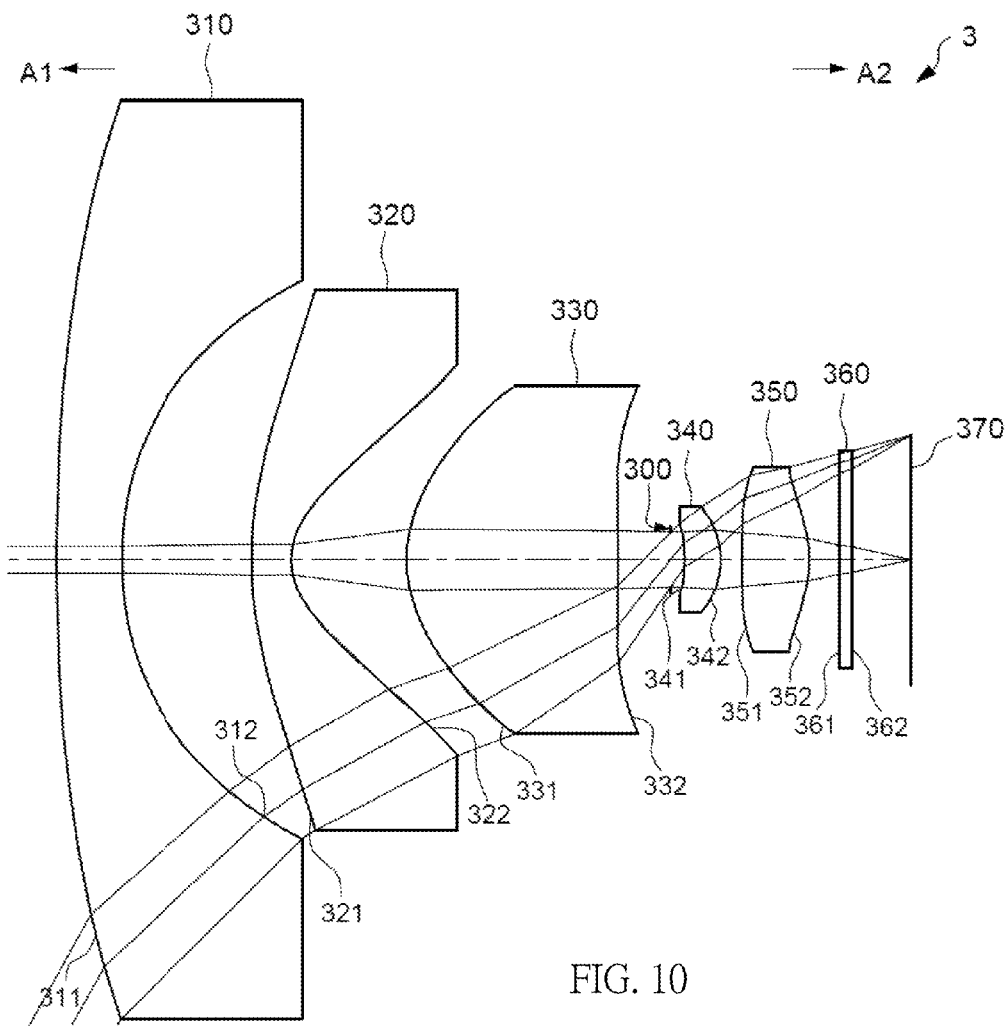
FIG. 10 is a cross-sectional view of a third embodiment of an optical imaging lens having five lens elements according to the present disclosure.
Figure 11:
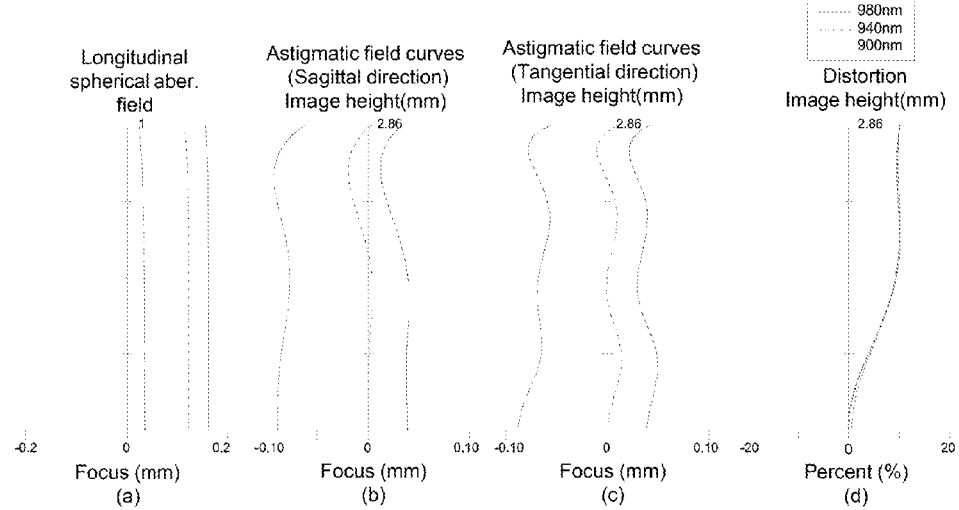
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises a first lens element 310, a second lens element 320, a third lens element 330, an aperture stop 300, a fourth lens element 340 and a fifth lens element 350.

The differences between the third embodiment and the first embodiment are the radius of curvature and thickness of each lens element, the distance of each air gap, but the configuration of the positive/negative refracting power of the first, second, third, fourth and fifth lens elements 310, 320, 330, 340, 350 and configuration of the concave/convex shape of surfaces, comprising the object-side surfaces 311, 321, 331, 341, 351 facing to the object side A1 and the image-side surfaces 312, 322, 332, 342, 352 facing to the image side A2, are similar to those in the first embodiment. Here, for clearly showing the drawings of the present embodiment, only the surface shapes which are different from that in the first embodiment are labeled. Please refer to FIG. 12 for the optical characteristics of each lens elements in the optical imaging lens 3 of the present embodiment, wherein the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 are:

$ALT/T2=10.67$;

$AAG/T5=5.00$;

$BFL/T4=2.87$;

$AAG/G34=5.04$;

$T5/T4=1.85$;

$AAG/T3=1.57$;

$T3/T4=5.88$;

$EFL/T5=0.94$;

$T4/T2=0.92$;

$T4/G34=0.54$;

AAG/T2=8.47;

ALT/T4=11.65;

T3/G12=1.63.

The distance from the object-side surface 311 of the first lens element 310 to the image plane 370 along the optical axis is 19.59 mm, the Fno is 2.40 and the HFOV is 61.00 degrees. Thus, the optical imaging lens 3 is capable to provide excellent imaging quality.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 3 of the present embodiment indeed shows great optical performance and the FOV of the optical imaging lens 3 is effectively broadened.

Figure 14:
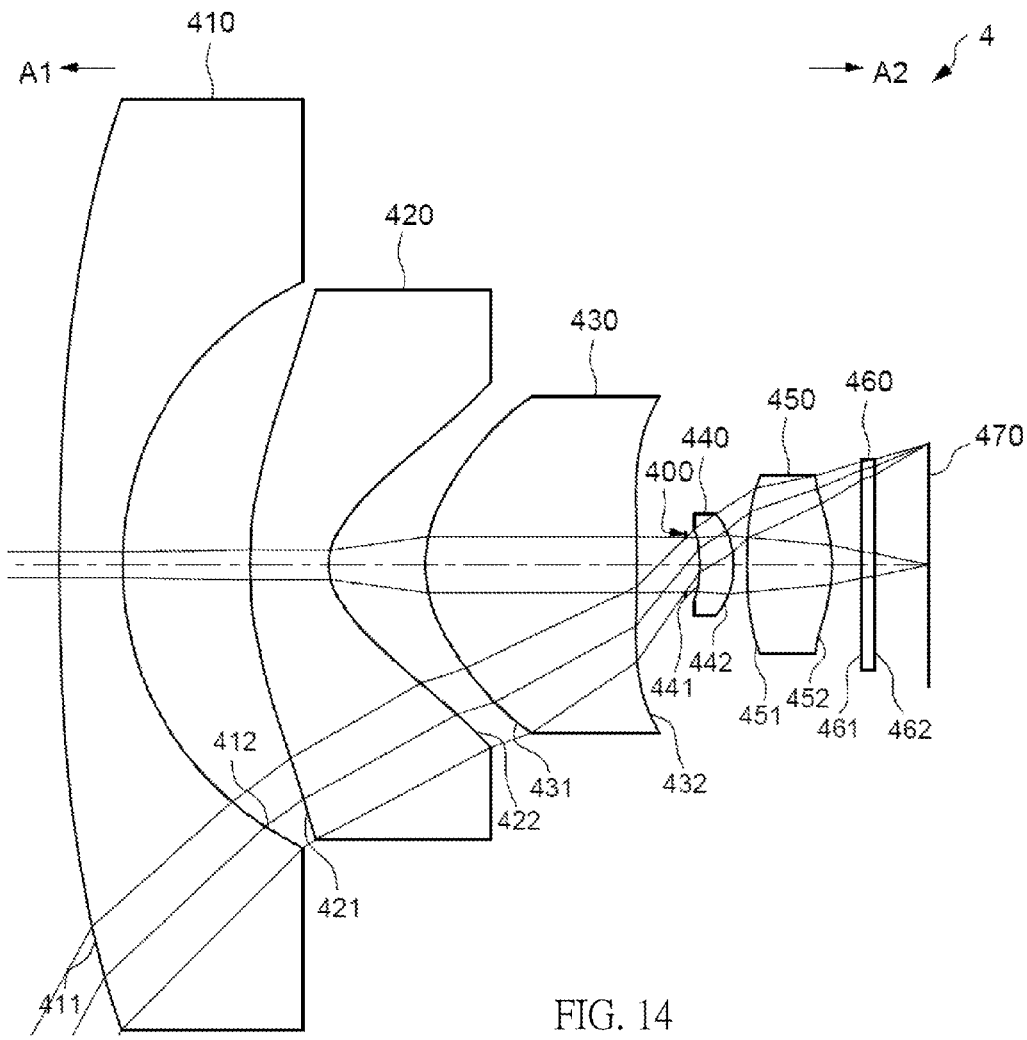
FIG. 14 is a cross-sectional view of a fourth embodiment of an optical imaging lens having five lens elements according to the present disclosure.
Figure 15:
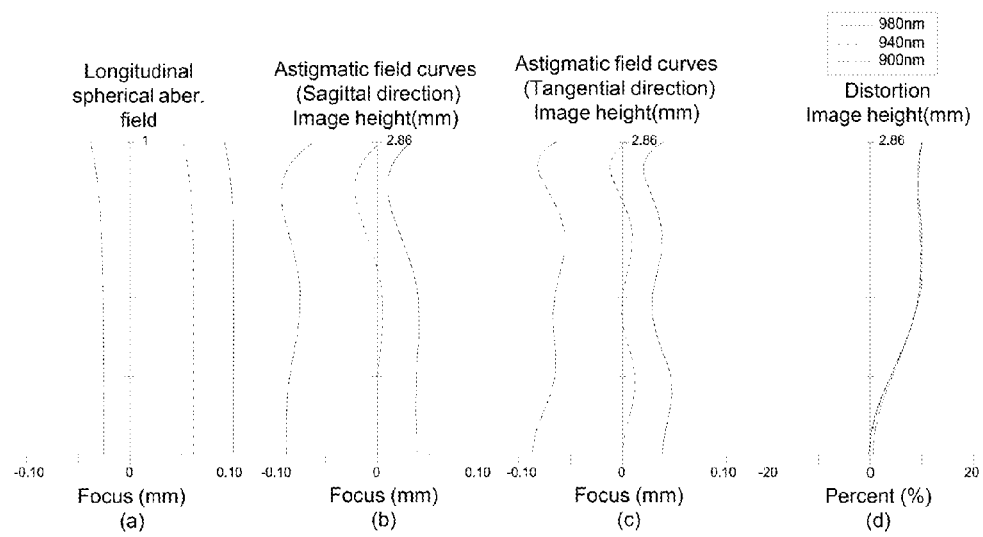
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises a first lens element 410, a second lens element 420, a third lens element 430, an aperture stop 400, a fourth lens element 440 and a fifth lens element 450.

The differences between the fourth embodiment and the first embodiment are the radius of curvature and thickness of each lens element, the distance of each air gap, but the configuration of the positive/negative refracting power of the first, second, third, fourth and fifth lens elements 410, 420, 430, 440, 450 and configuration of the concave/convex shape of surfaces, comprising the object-side surfaces 411, 421, 441, 431, 451 facing to the object side A1 and the image-side surfaces 412, 422, 432, 442, 452 facing to the image side A2, are similar to those in the first embodiment. Here, for clearly showing the drawings of the present embodiment, only the surface shapes which are different from that in the first embodiment are labeled. Please refer to FIG. 16 for the optical characteristics of each lens elements in the optical imaging lens 4 of the present embodiment, wherein the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 are:

ALT/T2=6.00;

AAG/T5=3.50;

BFL/T4=2.85;

AAG/G34=4.80;

T5/T4=2.50;

AAG/T3=1.41;

T3/T4=6.18;

EFL/T5=0.71;

T4/T2=0.43;

T4/G34=0.55;

AAG/T2=3.79;

ALT/T4=13.85;

T3/G12=1.65.

The distance from the object-side surface 411 of the first lens element 410 to the image plane 470 along the optical axis is 20.50 mm, the Fno is 2.40 and the HFOV is 61.00 degrees. Thus, the optical imaging lens 4 is capable to provide excellent imaging quality.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 4 of the present embodiment indeed shows great optical performance and the FOV of the optical imaging lens 4 is effectively broadened.

Figure 18:
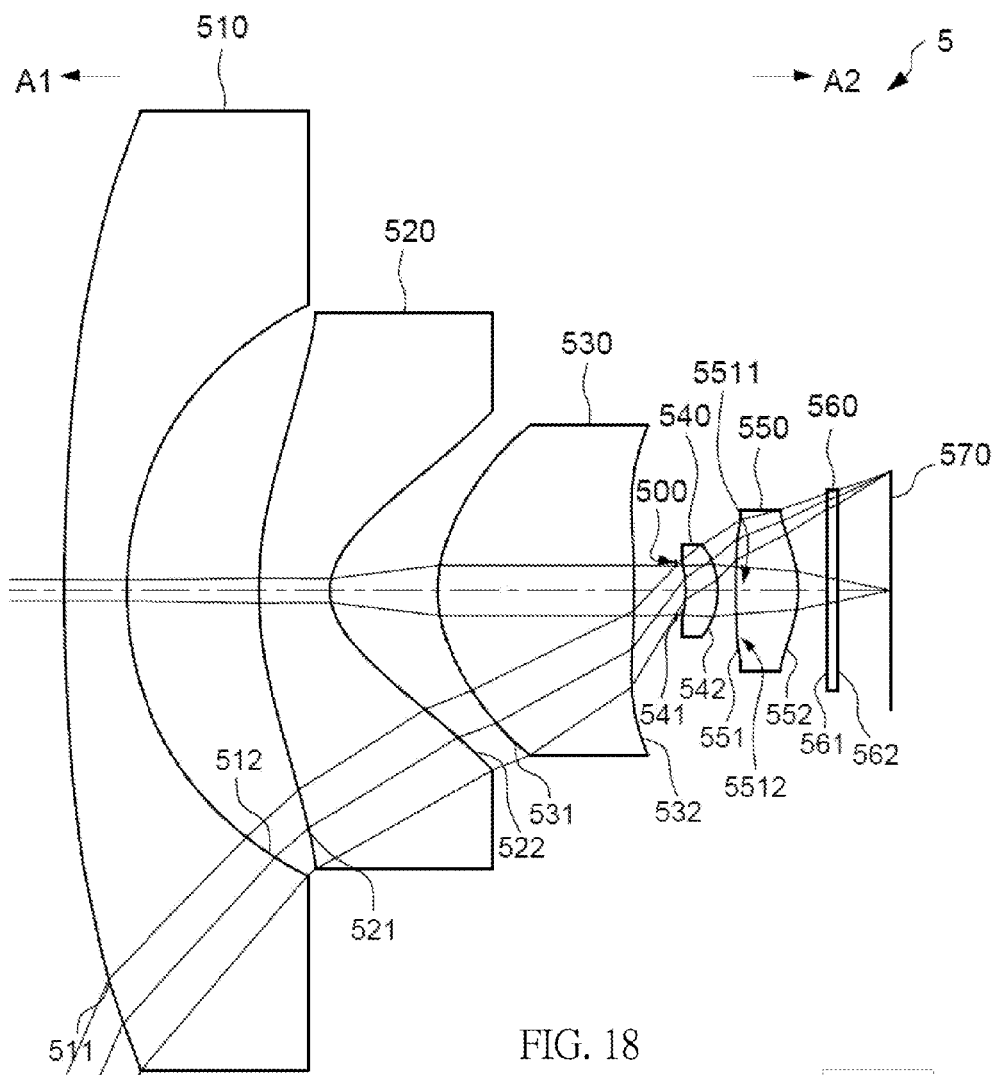
FIG. 18 is a cross-sectional view of a fifth embodiment of an optical imaging lens having five lens elements according to the present disclosure.
Figure 19:
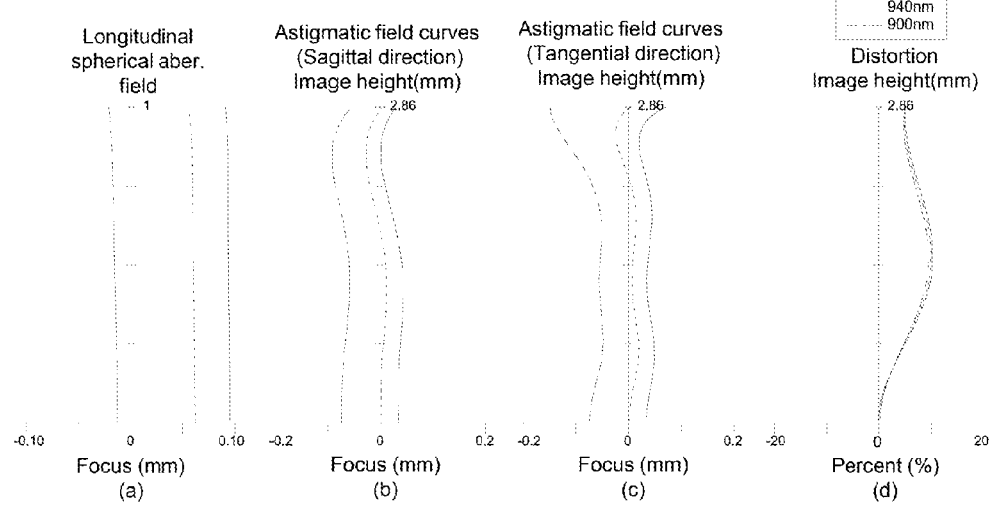
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises a first lens element 510, a second lens element 520, a third lens element 530, an aperture stop 500, a fourth lens element 540 and a fifth lens element 550.

The differences between the fifth embodiment and the second embodiment are the radius of curvature and thickness of each lens element and the distance of each air gap, but the configuration of the positive/negative refracting power of the first, second, third, fourth and fifth lens elements 510, 520, 530, 540, 550 and configuration of the concave/convex shape of surfaces, comprising the object-side surfaces 511, 521, 531, 541, 551 facing to the object side A1 and the image-side surfaces 512, 522, 532, 542, 552 facing to the image side A2, are similar to those in the second embodiment. Here, for clearly showing the drawings of the present embodiment, only the surface shapes which are different from that in the first embodiment are labeled. Please note that the object-side surface 551 of the fifth lens element 550 comprises a concave portion 5511 in a vicinity of the optical axis and a convex portion 5512 in a vicinity of a periphery of the fifth lens element 550. Please refer to FIG. 20 for the optical characteristics of each lens elements in the optical imaging lens 5 of the present embodiment, wherein the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 are:

$ALT/T2=6.01;$ $AAG/T5=4.99;$ $BFL/T4=2.88;$ $AAG/G34=6.06;$ $T5/T4=1.92;$ $AAG/T3=1.58;$ $T3/T4=6.08;$ $EFL/T5=0.81;$ $T4/T2=0.46;$ $T4/G34=0.63;$ $AAG/T2=4.39;$ $ALT/T4=13.11;$ $T3/G12=1.48.$

The distance from the object-side surface 511 of the first lens element 510 to the image plane 570 along the optical axis is 19.85 mm, the Fno is 2.40 and the HFOV is 66.12 degrees. Thus, the optical imaging lens 5 is capable to provide excellent imaging quality.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 5 of the present embodiment indeed shows great optical performance and the FOV of the optical imaging lens 5 is effectively broadened.

Figure 22:
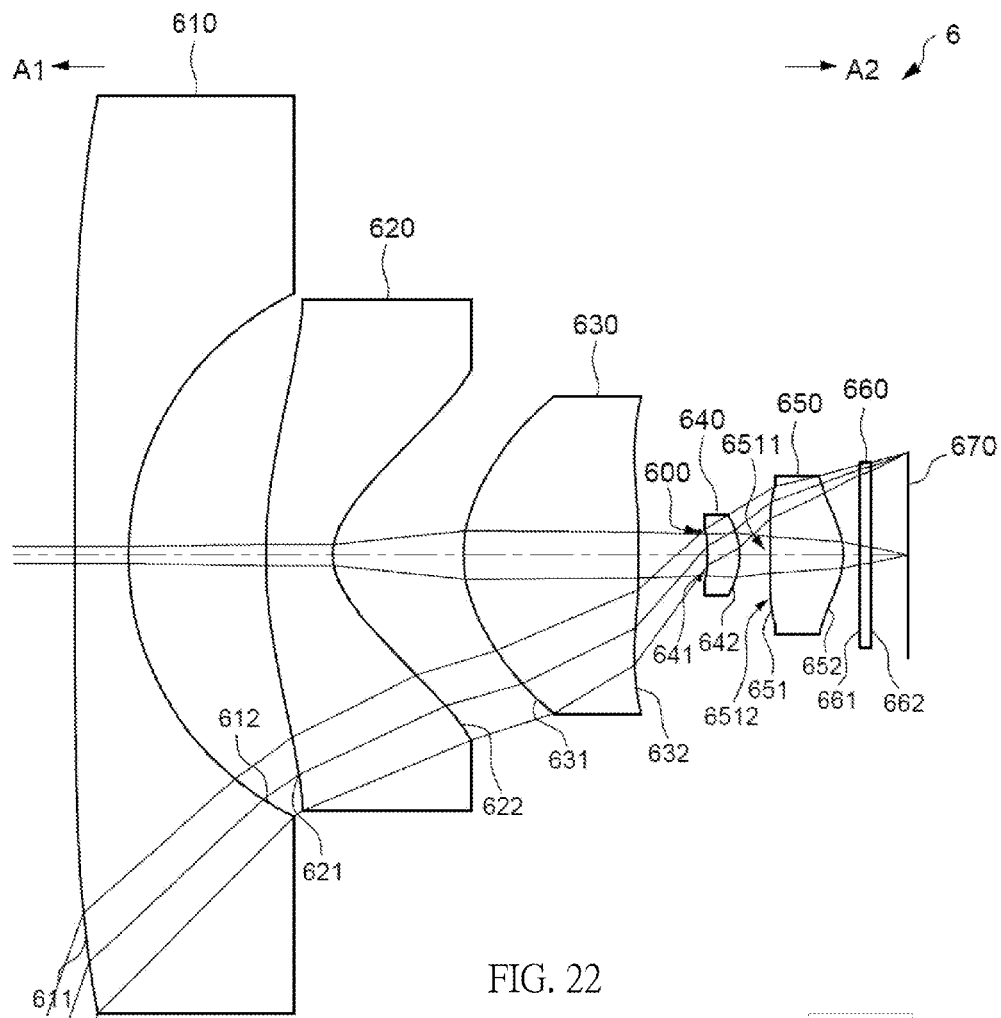
FIG. 22 is a cross-sectional view of a sixth embodiment of an optical imaging lens having five lens elements according to the present disclosure.
Figure 23:
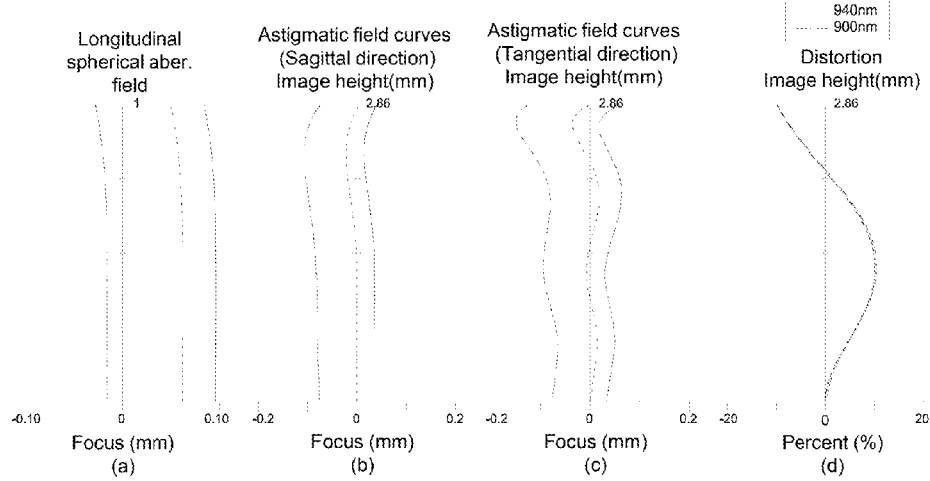
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises a first lens element 610, a second lens element 620, a third lens element 630, an aperture stop 600, a fourth lens element 640 and a fifth lens element 650.

The differences between the sixth embodiment and the second embodiment are the radius of curvature and thickness of each lens element and the distance of each air gap, but the configuration of the positive/negative refracting power of the first, second, third, fourth and fifth lens elements 610, 620, 630, 640, 650 and configuration of the concave/convex shape of surfaces, comprising the object-side surfaces 611, 621, 631, 641, 651 facing to the object side A1 and the image-side surfaces 612, 622, 632, 642, 652 facing to the image side A2, are similar to those in the second embodiment. Here, for clearly showing the drawings of the present embodiment, only the surface shapes which are different from that in the first embodiment are labeled. Please note that the object-side surface 651 of the fifth lens element 650 comprises a concave portion 6511 in a vicinity of the optical axis and a convex portion 6512 in a vicinity of a periphery of the fifth lens element 650. Please refer to FIG. 24 for the optical characteristics of each lens elements in the optical imaging lens 6 of the present embodiment, wherein the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 are:

$ALT/T2=6.01;$ $AAG/T5=4.99;$ $BFL/T4=2.03;$ $AAG/G34=5.36;$ $T5/T4=2.30;$ $AAG/T3=2.09;$ $T3/T4=5.48;$ $EFL/T5=0.55;$ $T4/T2=0.48;$ $T4/G34=0.47;$ $AAG/T2=5.50;$ $ALT/T4=12.56;$ $T3/G12=1.27.$

The distance from the object-side surface 611 of the first lens element 610 to the image plane 670 along the optical axis is 23.26 mm, the Fno is 2.40 and the HFOV is 70.39 degrees. Thus, the optical imaging lens 6 is capable to provide excellent imaging quality.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 6 of the present embodiment indeed shows great optical performance and the FOV of the optical imaging lens 6 is effectively broadened.

Figure 26:
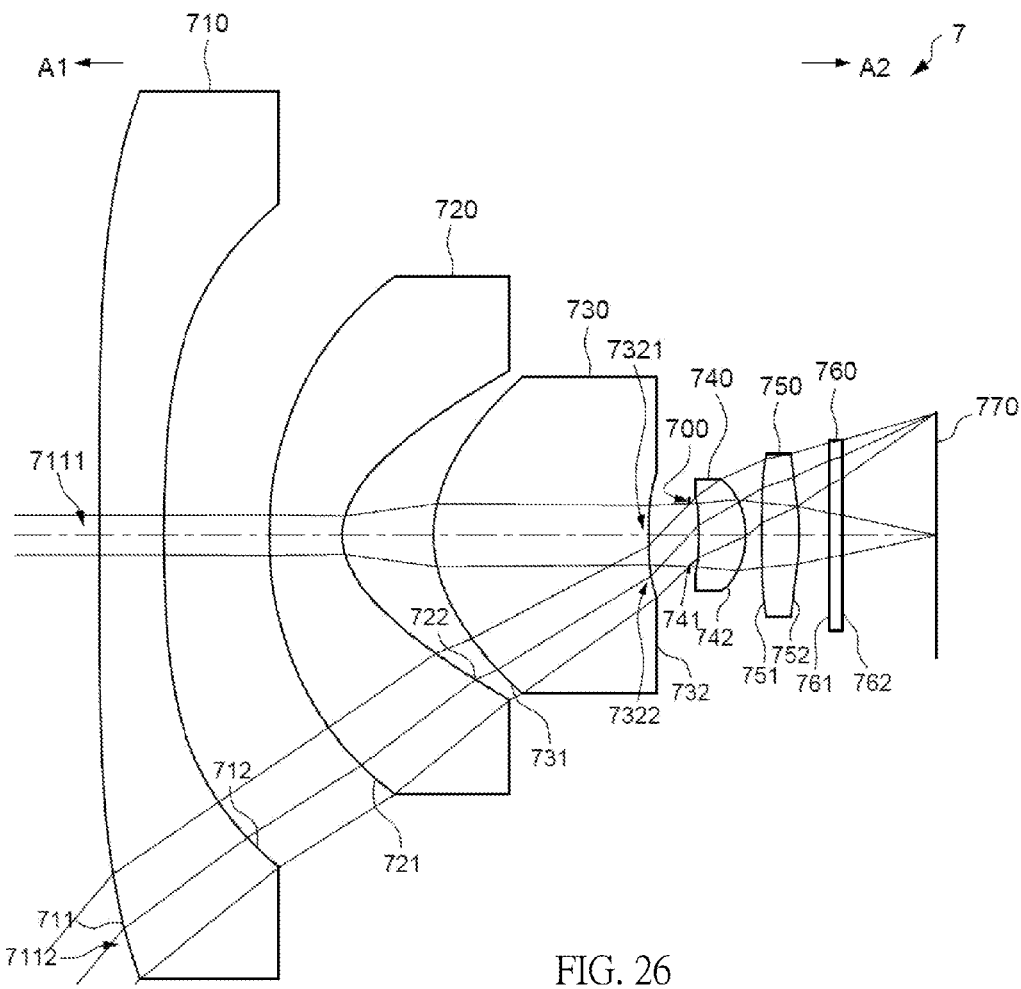
FIG. 26 is a cross-sectional view of a seventh embodiment of an optical imaging lens having five lens elements according to the present disclosure.
Figure 27:
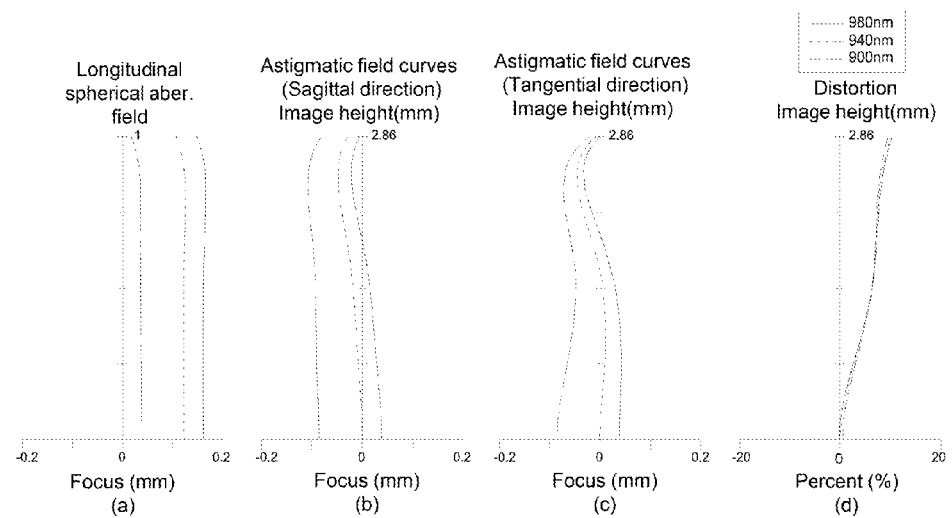
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having five lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises a first lens element 710, a second lens element 720, a third lens element 730, an aperture stop 700, a fourth lens element 740 and a fifth lens element 750.

The differences between the seventh embodiment and the first embodiment are the radius of curvature and thickness of each lens element, the distance of each air gap and the configuration of the concave/convex shape of the object-side surfaces 711 and the image-side surfaces 732, but the configuration of the positive/negative refracting power of the first, second, third, fourth and fifth lens elements 710, 720, 730, 740, 750 and configuration of the concave/convex shape of surfaces, comprising the object-side surfaces 721, 731, 741, 751 facing to the object side A1 and the image-side surfaces 712, 722, 742, 752 facing to the image side A2, are similar to those in the first embodiment. Here, for clearly showing the drawings of the present embodiment, only the surface shapes which are different from that in the first embodiment are labeled. Specifically, the object-side surface 711 of the first lens element 710 comprises a concave portion 7111 in a vicinity of the optical axis and a convex portion 7112 in a vicinity of a periphery of the first lens element 710, the image-side surfaces 732 is a concave surface comprising a concave portion 7321 in a vicinity of the optical axis and a concave portion 7322 in a vicinity of a periphery of the third lens element 730. Please refer to FIG. 28 for the optical characteristics of each lens elements in the optical imaging lens 7 of the present embodiment, wherein the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 are:

$ALT/T2=6.01;$ $AAG/T5=6.96;$ $BFL/T4=2.96;$ $AAG/G34=5.27;$ $T5/T4=0.81;$ $AAG/T3=1.22;$ $T3/T4=4.63;$ $EFL/T5=2.51;$ $T4/T2=0.64;$ $T4/G34=0.94;$ $AAG/T2=3.61;$ $ALT/T4=9.38;$ $T3/G12=2.03.$

The distance from the object-side surface 711 of the first lens element 710 to the image plane 770 along the optical axis is 19.48 mm, the Fno is 2.40 and the HFOV is 49.73 degrees. Thus, the optical imaging lens 7 is capable to provide excellent imaging quality.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 7 of the present embodiment indeed shows great optical performance and the FOV of the optical imaging lens 7 is effectively broadened.

Figure 30:
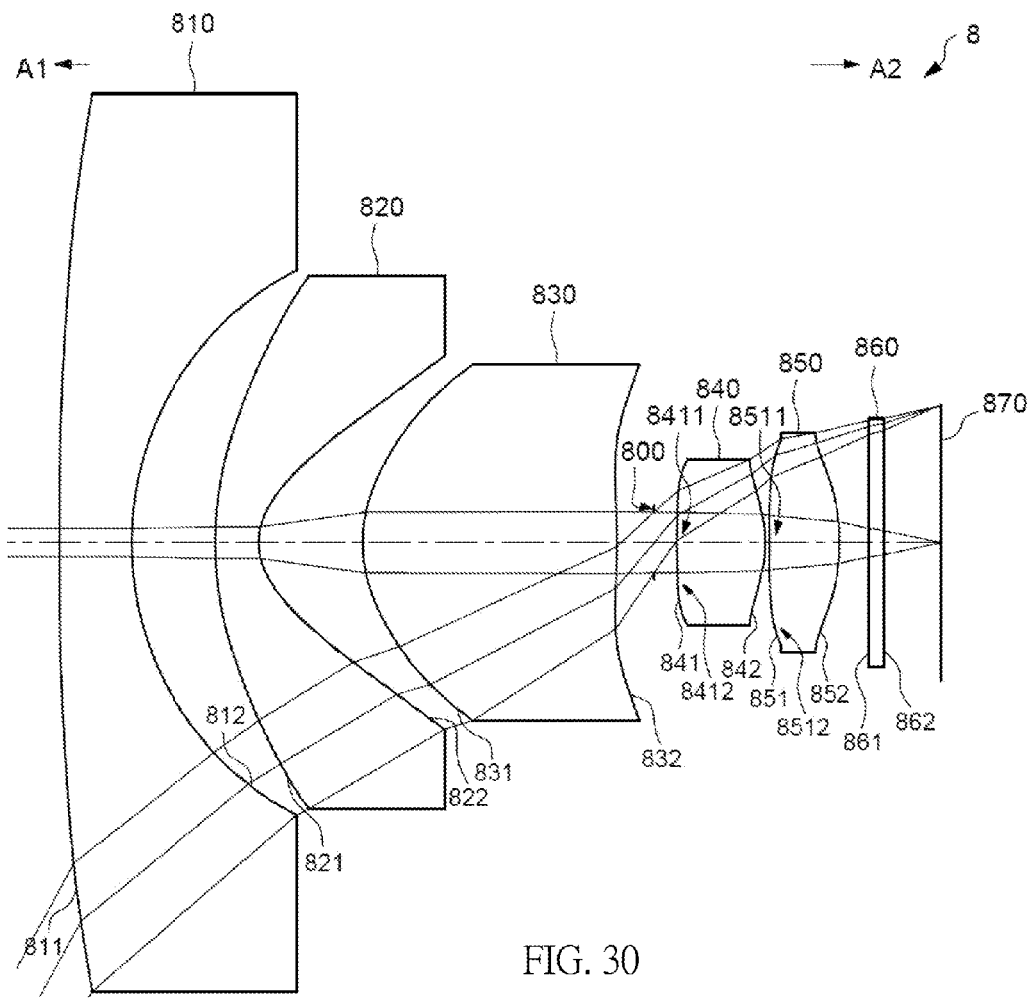
FIG. 30 is a cross-sectional view of an eighth embodiment of an optical imaging lens having five lens elements according to the present disclosure.
Figure 31:
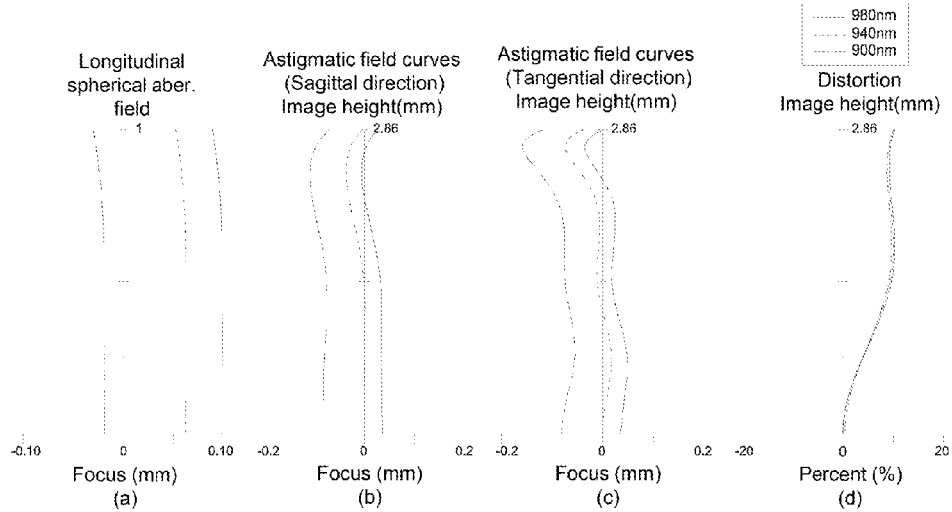
FIG. 31 is a chart of longitudinal spherical aberration and other kinds of optical aberrations of an eighth embodiment of the optical imaging lens according the present disclosure.

Reference is now made to FIGS. 30-33. FIG. 30 illustrates an example cross-sectional view of an optical imaging lens 8 having five lens elements of the optical imaging lens according to a eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises a first lens element 810, a second lens element 820, a third lens element 830, an aperture stop 800, a fourth lens element 840 and a fifth lens element 850.

The differences between the eighth embodiment and the second embodiment are the radius of curvature and thickness of each lens element, the distance of each air gap and the configuration of the concave/convex shape of the object-side surfaces 841, but the configuration of the positive/negative refracting power of the first, second, third, fourth and fifth lens elements 810, 820, 830, 840, 850 and configuration of the concave/convex shape of surfaces, comprising the object-side surfaces 811, 821, 831, 851 facing to the object side A1 and the image-side surfaces 812, 822, 832, 842, 852 facing to the image side A2, are similar to those in the second embodiment, and the object-side surface 851 of the fifth lens element 850 comprises a concave portion 8511 in a vicinity of the optical axis and a convex portion 8512 in a vicinity of a periphery of the fifth lens element 850. Here, for clearly showing the drawings of the present embodiment, only the surface shapes which are different from that in the second embodiment are labeled. Specifically, the object-side surface 841 of the fourth lens element 840 comprises a convex portion 8411 in a vicinity of the optical axis and a convex portion 8412 in a vicinity of a periphery of the fourth lens element 840. Please refer to FIG. 24 for the optical characteristics of each lens elements in the optical imaging lens 8 of the present embodiment, wherein the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 are:

$ALT/T2=12.19;$ $AAG/T5=3.61;$ $BFL/T4=1.15;$ $AAG/G34=4.25;$ $T5/T4=0.79;$ $AAG/T3=0.99;$ $T3/T4=2.88;$ $EFL/T5=0.97;$ $T4/T2=2.04;$ $T4/G34=1.49;$ $AAG/T2=5.83;$ $ALT/T4=5.98;$ $T3/G12=3.01.$

The distance from the object-side surface 811 of the first lens element 810 to the image plane 870 along the optical axis is 18.33 mm, the Fno is 2.40 and the HFOV is 61.50 degrees. Thus, the optical imaging lens 8 is capable to provide excellent imaging quality.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 8 of the present embodiment indeed shows great optical performance and the FOV of the optical imaging lens 8 is effectively broadened.

Please refer to FIG. 34, which shows the values of T1~T5, G12~G45, BFL, AAG, ALT, TTL, EFL, ALT/T2, AAG/T5, BFL/T4, AAG/G34, T5/T4, AAG/T3, T3/T4, EFL/T5, T4/T2, T4/G34, AAG/T2, ALT/T4 and T3/G12 of all eight embodiments, and it is clear that the optical imaging lens of the present invention satisfy the Equations (1), (2), (3), (4), (5), (6), (7), (8), (9), (10), (11), (12) and/or (13).

Figure 35:
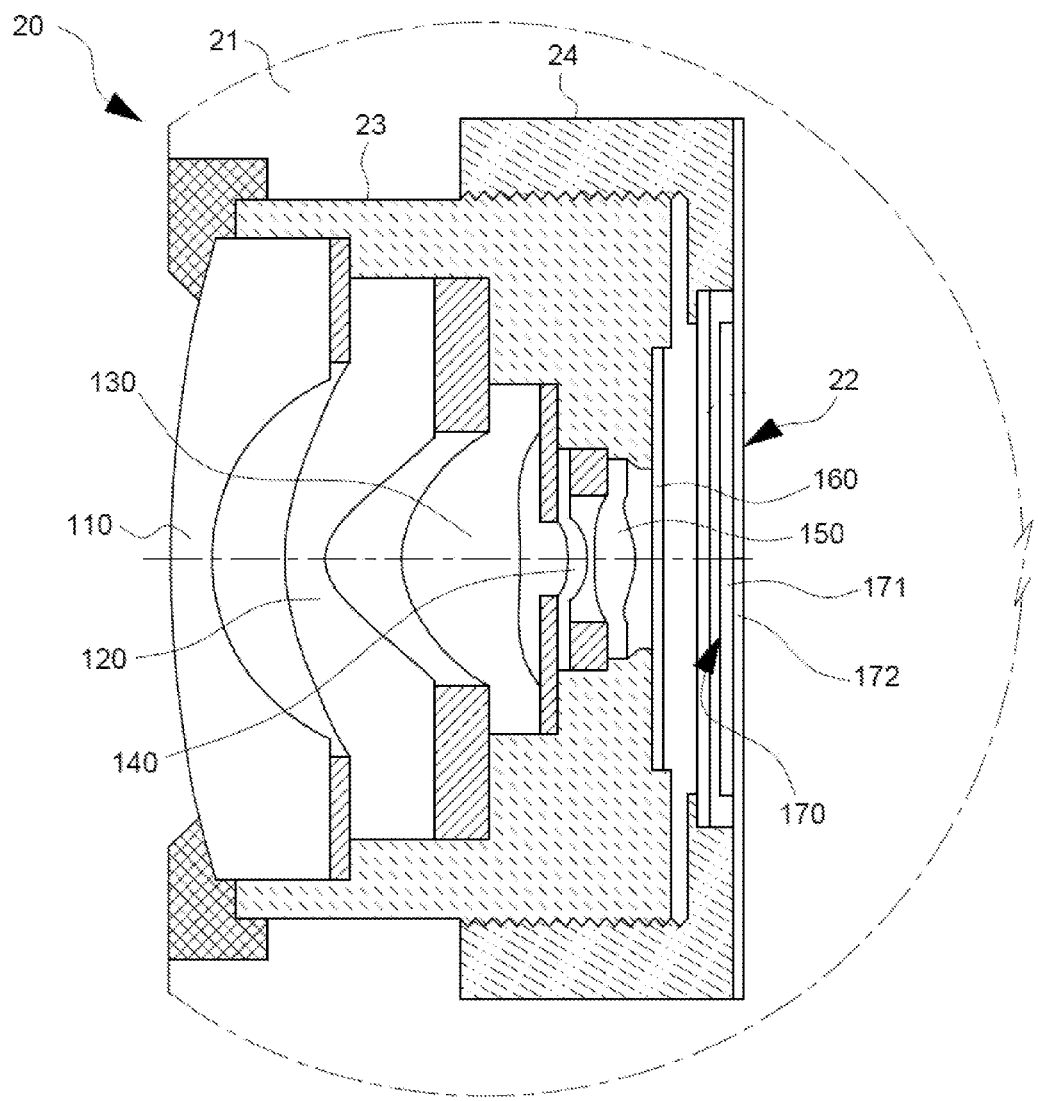
FIG. 35 is a structure of an example embodiment of an electronic device.

Reference is now made to FIG. 35, which illustrates an example structural view of a first embodiment of electronic device 20 applying an aforesaid optical imaging lens. The electronic device 20 comprises a housing 21 and a photography module 22 positioned in the housing 21. Examples of the electronic device 20 may be, but are not limited to, an environmental monitor, a vehicle video recorder, a vehicle rearview camera, wild angle lens camera, a video game console, etc.

As shown in FIG. 35, the photography module 22 may comprise an aforesaid optical imaging lens with five lens elements, which is a prime lens and for example the optical imaging lens 1 of the first embodiment, a lens barrel 23 for positioning the optical imaging lens 1, a module housing unit 24 for positioning the lens barrel 23, a substrate 172 for positioning the module housing unit 24, and an image sensor 171 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 are positioned in the lens barrel 23 in the way of separated by an air gap between any two adjacent lens elements.

Because the length of the optical imaging lens 1 is 19.16 mm, the Fno is 2.4 and the HFOV is 61.00 degrees, the image quality of the electronic device 20 may be quite good. Therefore, the embodiments described herein meet the market demands for the product designs with a broadened FOV.

According to above illustration, it is clear that the electronic device and the optical imaging lens thereof in example embodiments, through controlling the detail structure of the lens elements, the refracting power of some lens elements and an inequality, the field of view of the optical imaging lens is effectively broadened and meanwhile good optical characteristics are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth and fifth lens elements, each of said first, second, third, fourth and fifth lens elements having refracting power, an object-side surface facing toward the object side, an image-side surface facing toward the image side and a central thickness defined along the optical axis, wherein:

said first lens element has negative refracting power;

said object-side surface of said second lens element comprises a convex portion in a vicinity of a periphery of the second lens element and said image surface of said second lens element comprises a concave portion in the vicinity of a periphery of the second lens element;

said object-side surface of said third lens element comprises a convex portion in a vicinity of a periphery of the third lens element;

said image-side surface of said fifth lens element comprises a convex portion in a vicinity of a periphery of the fifth lens element;

the optical imaging lens comprises no other lenses having refracting power beyond the five lens elements; and the central thickness of the second lens element is represented by T2, a sum of the central thicknesses of all five lens elements is represented by ALT, and T2 and ALT satisfy the equation:

$6 \le ALT/T2 \le 13.0$;

an air gap between the third lens element and the fourth lens element along the optical axis is represented by G34, the central thickness of the fourth lens element is represented by T4, and T4 and G34 satisfy the equation:

$T4/G34 \ge 1.5$; and wherein the central thickness of the third lens element is represented by T3, and T4 and T3 satisfy the equation:

$2 \le T3/T4 \le 7.0$.

2. The optical imaging lens according to claim 1, wherein the central thickness of the fifth lens element is represented by T5, a sum of all four air gaps from the first lens element to the fifth lens element along the optical axis is represented by AAG, and T5 and AAG satisfy the equation:

$AAG/T5 \le 7$.

3. The optical imaging lens according to claim 2, wherein a back focal length of the optical imaging lens, which is defined as a distance from the image-side surface of the fifth lens element to an image plane along the optical axis, is represented by BFL, and T4 and BFL satisfy the equation:

$1.7 \le BFL/T4 \le 4.2$.

4. The optical imaging lens according to claim 3, wherein G34 and AAG satisfy the equation:

$AAG/G34 \le 7$.

5. The optical imaging lens according to claim 2, wherein T4 and T5 satisfy the equation:

$0.75 \le T5/T4 \le 3.0$.

6. The optical imaging lens according to claim 5, wherein T3 and AAG satisfy the equation:

$AAG/T3 \le 2.3$.

7. The optical imaging lens according to claim 1, wherein the central thickness of the fifth lens element is represented by T5, and T4 and T5 satisfy the equation:

$0.75 \le T5/T4 \le 3.0$.

8. The optical imaging lens according to claim 7, wherein an effective focal length of the optical imaging lens is represented by EFL, and T5 and EFL satisfy the equation:

$EFL/T5 \le 3$.

9. The optical imaging lens according to claim 1, wherein said image-side surface of said fourth lens element comprises a convex portion in the vicinity of the optical axis.

10. The optical imaging lens according to claim 9, wherein T2 and T4 satisfy the equation:

$T4/T2 \le 2.05$.

11. The optical imaging lens according to claim 1, wherein G34>0, a sum of all four air gaps from the first lens element to the fifth lens element along the optical axis is represented by AAG, and T2 and AAG satisfy the equation:

$AAG/T2 \le 8.5$.

12. The optical imaging lens according to claim 11, wherein T4 and ALT satisfy the equation:

$5.0 \le ALT/T4 \le 14.5$.

13. The optical imaging lens according to claim 12, wherein the central thickness of the third lens element is represented by T3, an air gap between the first lens element and the second lens element along the optical axis is represented by G12, and T3 and G12 satisfy the equation:

$1.1 \le T3/G12 \le 3.5$.

14. An electronic device, comprising:

a housing; and a photography module positioned in the housing and comprising: an optical imaging lens, sequentially from an object side to an image side along an optical axis, comprising first, second, third, fourth and fifth lens elements, each of said first, second, third, fourth and fifth lens elements having refracting power, an object-side surface facing toward the object side, an image-side surface facing toward the image side and a central thickness defined along the optical axis, wherein:

said first lens element has negative refracting power;

said object-side surface of said second lens element comprises a convex portion in a vicinity of a periphery of the second lens element and said image surface of said second lens element comprises a concave portion in the vicinity of a periphery of the second lens element;

said object-side surface of said third lens element comprises a convex portion in a vicinity of a periphery of the third lens element;

said image-side surface of said fifth lens element comprises a convex portion in a vicinity of a periphery of the fifth lens element;

the optical imaging lens comprises no other lenses having refracting power beyond the five lens elements;

the central thickness of the second lens element is represented by T2, a sum of the central thicknesses of all five lens elements is represented by ALT, and T2 and ALT satisfy the equation:

$6 \le ALT/T2 \le 13.0$; and an air gap between the third lens element and the fourth lens element along the optical axis is represented by G34, the central thickness of the fourth lens element is represented by T4, and T4 and G34 satisfy the equation:

$T4/G34 \le 1.5$; and wherein the central thickness of the third lens element is represented by T3, and T4 and T3 satisfy the equation:

$2 \leq T3/T4 \leq 7.0$;

a lens barrel for positioning the optical imaging lens;
a module housing unit for positioning the lens barrel; and
an image sensor positioned at the image side of the optical imaging lens.

* * * * *

UNITED STATES PATENT AND TRADEMARK OFFICE
CERTIFICATE OF CORRECTION

PATENT NO. : 9,632,283 B2
APPLICATION NO. : 14/279906
DATED : April 25, 2017
INVENTOR(S) : Hsu et al.

It is certified that error appears in the above-identified patent and that said Letters Patent is hereby corrected as shown below:

Claim 1, Column 23, Line 31 should read: "$T4/G34 \leq 1.5$; and"

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*